(12) United States Patent
Gray

(10) Patent No.: US 6,268,788 B1
(45) Date of Patent: Jul. 31, 2001

(54) APPARATUS AND METHOD FOR PROVIDING AN AUTHENTICATION SYSTEM BASED ON BIOMETRICS

(75) Inventor: Robert J. Gray, Costa Mesa, CA (US)

(73) Assignee: Litronic Inc., Irvine, CA (US)

( * ) Notice: Subject to any disclaimer, the term of this patent is extended or adjusted under 35 U.S.C. 154(b) by 0 days.

(21) Appl. No.: 09/153,668

(22) Filed: Sep. 15, 1998

Related U.S. Application Data

(63) Continuation-in-part of application No. 08/744,363, filed on Nov. 7, 1996, now Pat. No. 5,844,497.

(51) Int. Cl.[7] .............................. G06F 7/04; G06F 17/00
(52) U.S. Cl. .......................... 340/5.2; 340/5.1; 340/5.6; 235/380; 235/375; 235/382; 713/182
(58) Field of Search ........................ 340/5.2, 5.6, 5.8, 340/5.54, 5.74, 5.1; 235/379, 380, 382, 375; 713/182, 183, 184, 185, 186, 189

(56) References Cited

U.S. PATENT DOCUMENTS

| | | | |
|---|---|---|---|
| 3,609,690 | 9/1971 | Nissman et al. | 340/149 R |
| 3,764,742 | 10/1973 | Abbott et al. | 178/22 |
| 4,295,039 | 10/1981 | Stuckert | 235/380 |
| 4,376,279 | 3/1983 | Perlman et al. | 235/380 |
| 4,501,957 | 2/1985 | Perlman et al. | 235/379 |
| 4,598,170 | 7/1986 | Piosenka et al. | 178/22.08 |
| 4,688,020 | 8/1987 | Kuehneman et al. | 340/365 |
| 4,783,798 | 11/1988 | Liebholz et al. | 380/23 |
| 4,797,928 | 1/1989 | Dykes | 380/49 |
| 4,881,263 | 11/1989 | Herbison et al. | 380/21 |
| 4,914,696 | 4/1990 | Dudczak et al. | 380/21 |
| 4,924,513 | 5/1990 | Herbison et al. | 380/21 |
| 4,942,606 | 7/1990 | Kaiser et al. | 380/4 |
| 4,951,249 | 8/1990 | McClung et al. | 364/900 |
| 4,965,804 | 10/1990 | Trbovich et al. | 380/21 |
| 4,980,913 | 12/1990 | Skret | 380/23 |
| 4,984,272 | 1/1991 | McIlroy et al. | 380/25 |
| 4,995,112 | 2/1991 | Aoyama | 380/25 |
| 5,001,755 | 3/1991 | Skret | 380/46 |
| 5,018,096 | 5/1991 | Aoyama | 364/900 |
| 5,048,087 | 9/1991 | Trbovich et al. | 380/43 |
| 5,063,596 | 11/1991 | Dyke | 380/49 |
| 5,065,429 | 11/1991 | Lang | 380/25 |
| 5,093,861 | 3/1992 | Graham | 380/23 |
| 5,097,506 | 3/1992 | Kaiser, Jr. | 380/25 |
| 5,204,512 | 4/1993 | Ieki et al. | 235/382 |
| 5,212,729 | 5/1993 | Schafer | 380/4 |
| 5,224,166 | 6/1993 | Hartman | 380/50 |
| 5,233,655 | 8/1993 | Shapiro | 380/23 |
| 5,297,200 | 3/1994 | Murray | 380/4 |
| 5,313,637 | 5/1994 | Rose | 395/725 |
| 5,327,497 | 7/1994 | Mooney et al. | 380/25 |
| 5,406,624 | 4/1995 | Tulpan | 380/4 |
| 5,442,342 | 8/1995 | Kung | 340/825.34 |
| 5,515,440 | 5/1996 | Mooney et al. | 380/25 |

Primary Examiner—William A. Cuchlinski, Jr.
Assistant Examiner—Yonel Beaulieu

(57) ABSTRACT

A method and apparatus for controlling access to at least one program on a computer by verifying data entered through a scanner with data stored on a token such as a card, while isolating the entered data from the computer. The apparatus includes a scanner, a memory and a processor coupled to the scanner and memory. When activated, the scanner scans a field which the processor compares with a field stored in the memory. The processor is operable in a first mode wherein access to the computer via a keyboard is inhibited when the scanned field does not match the stored field. The processor is operable in a second mode, wherein the keyboard is coupled to the computer so that the at least one program on the computer is accessible via the keyboard when the scanned field matches the stored field. Various embodiments are disclosed.

22 Claims, 19 Drawing Sheets

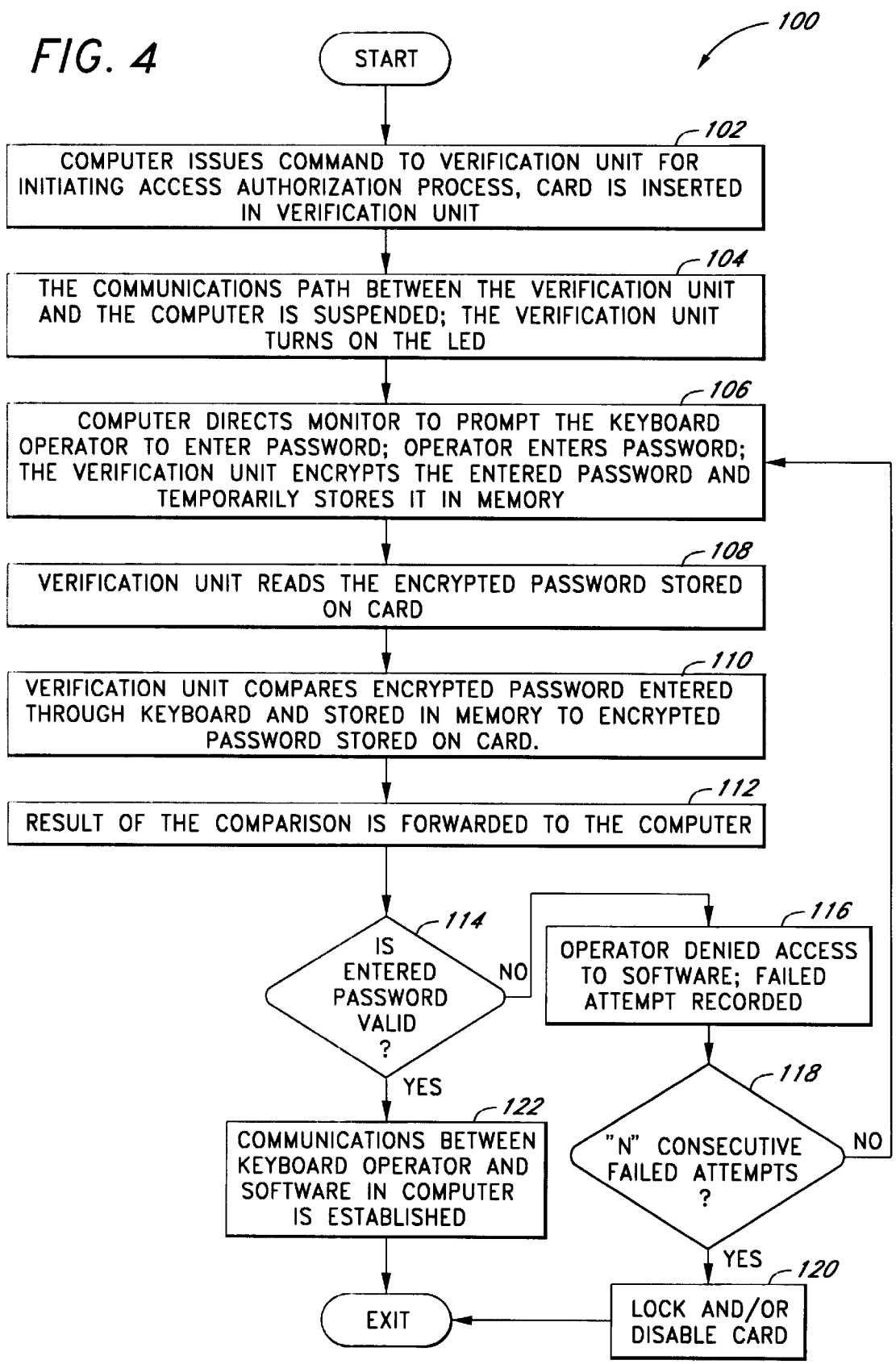

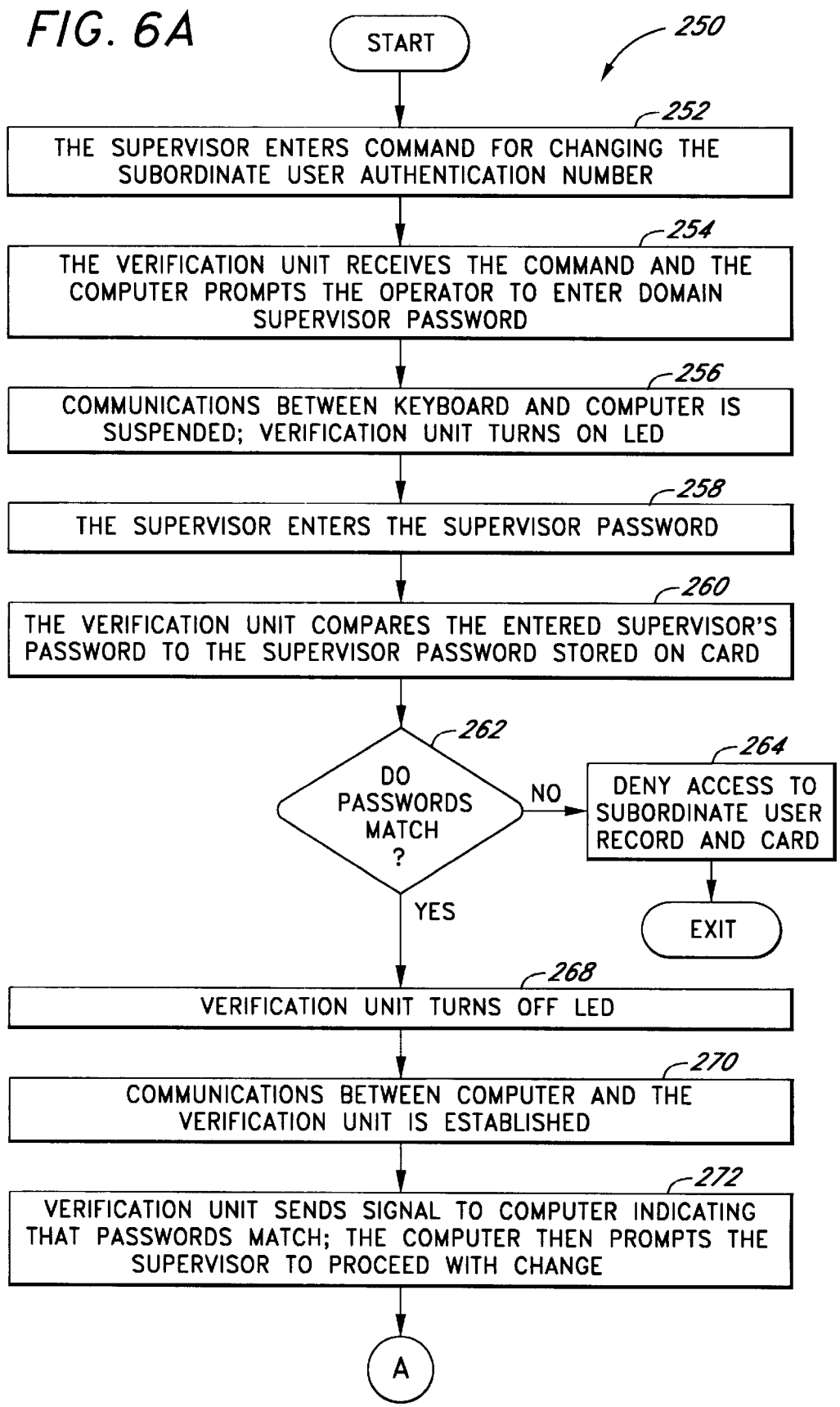

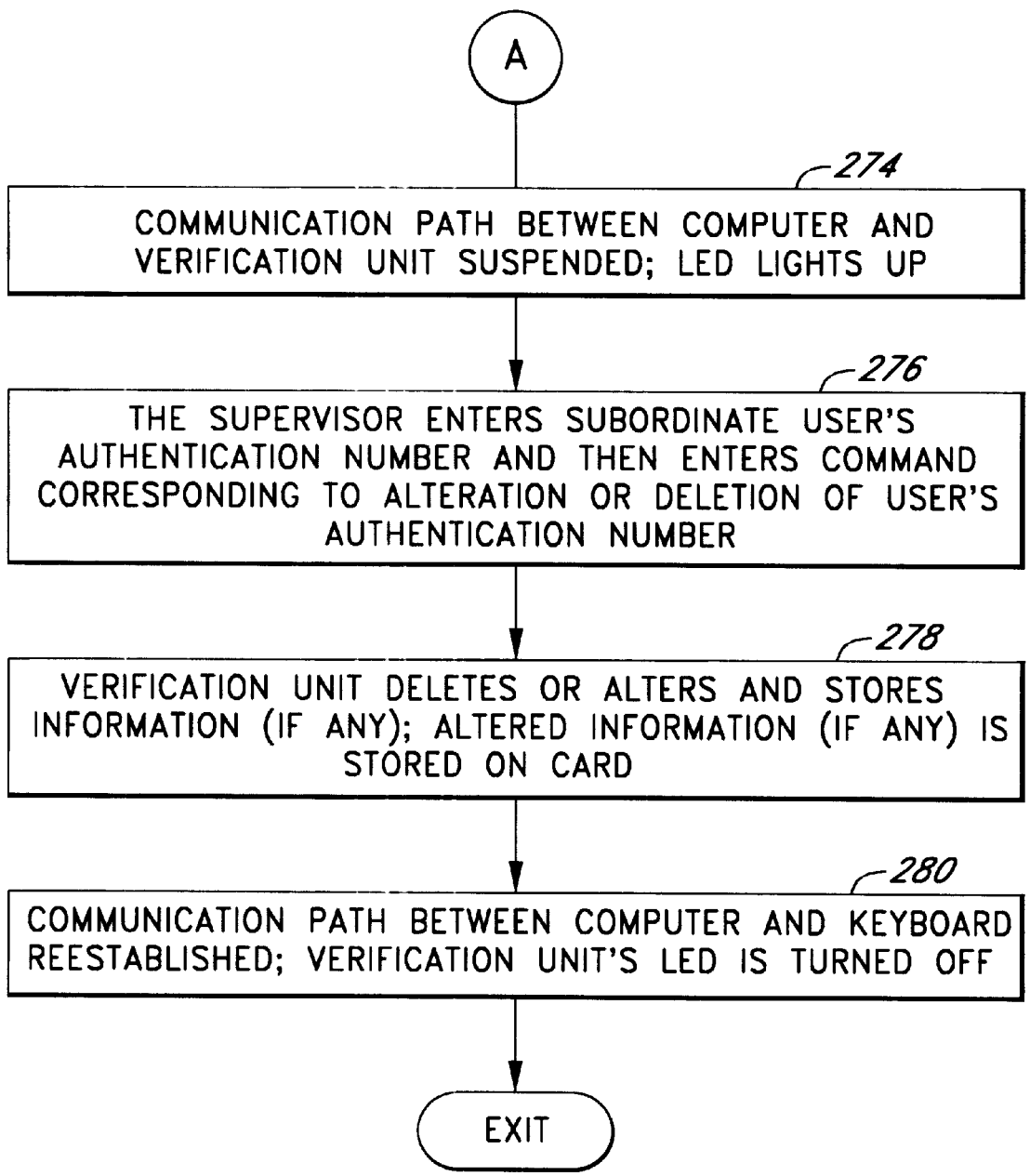

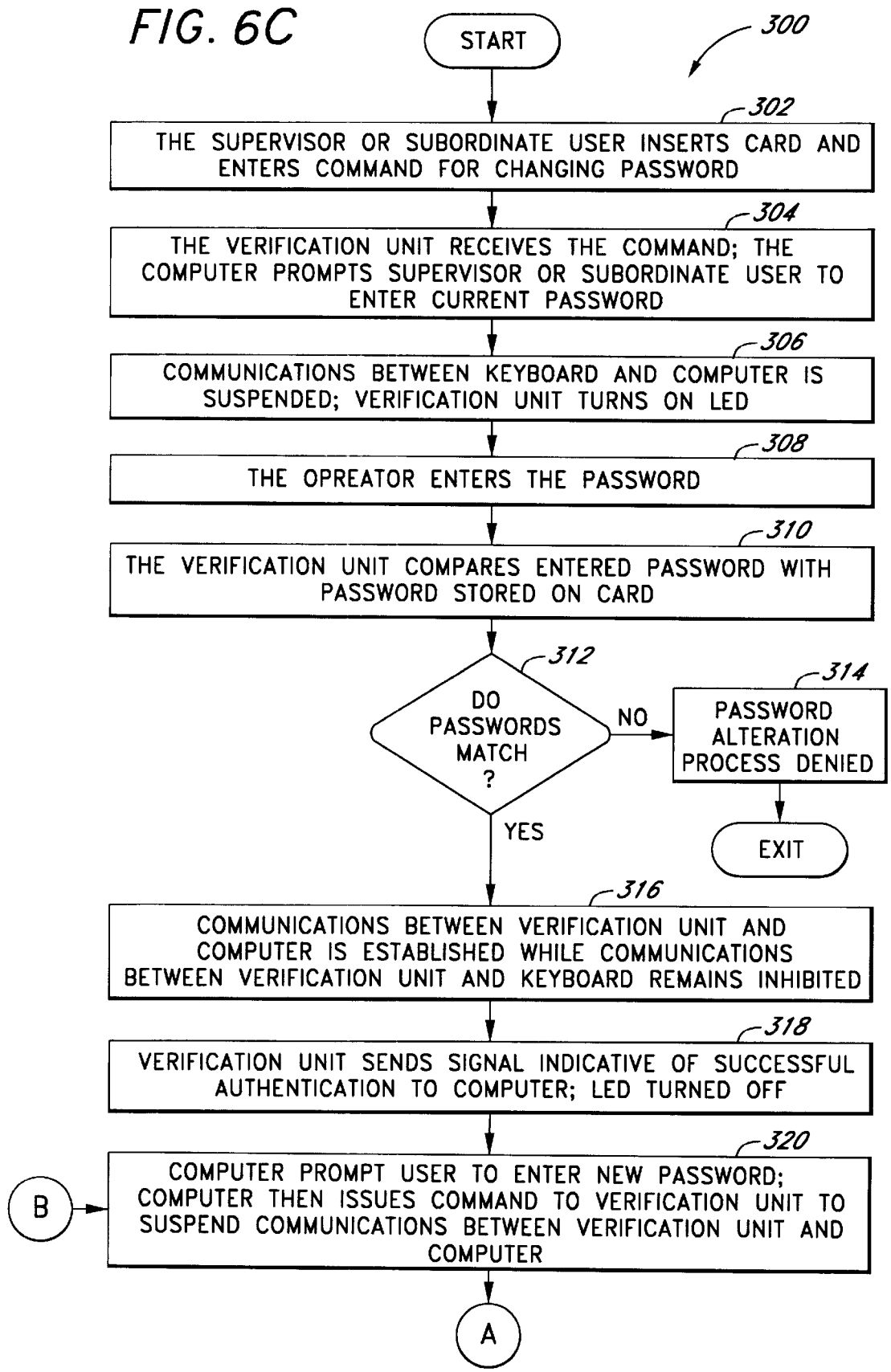

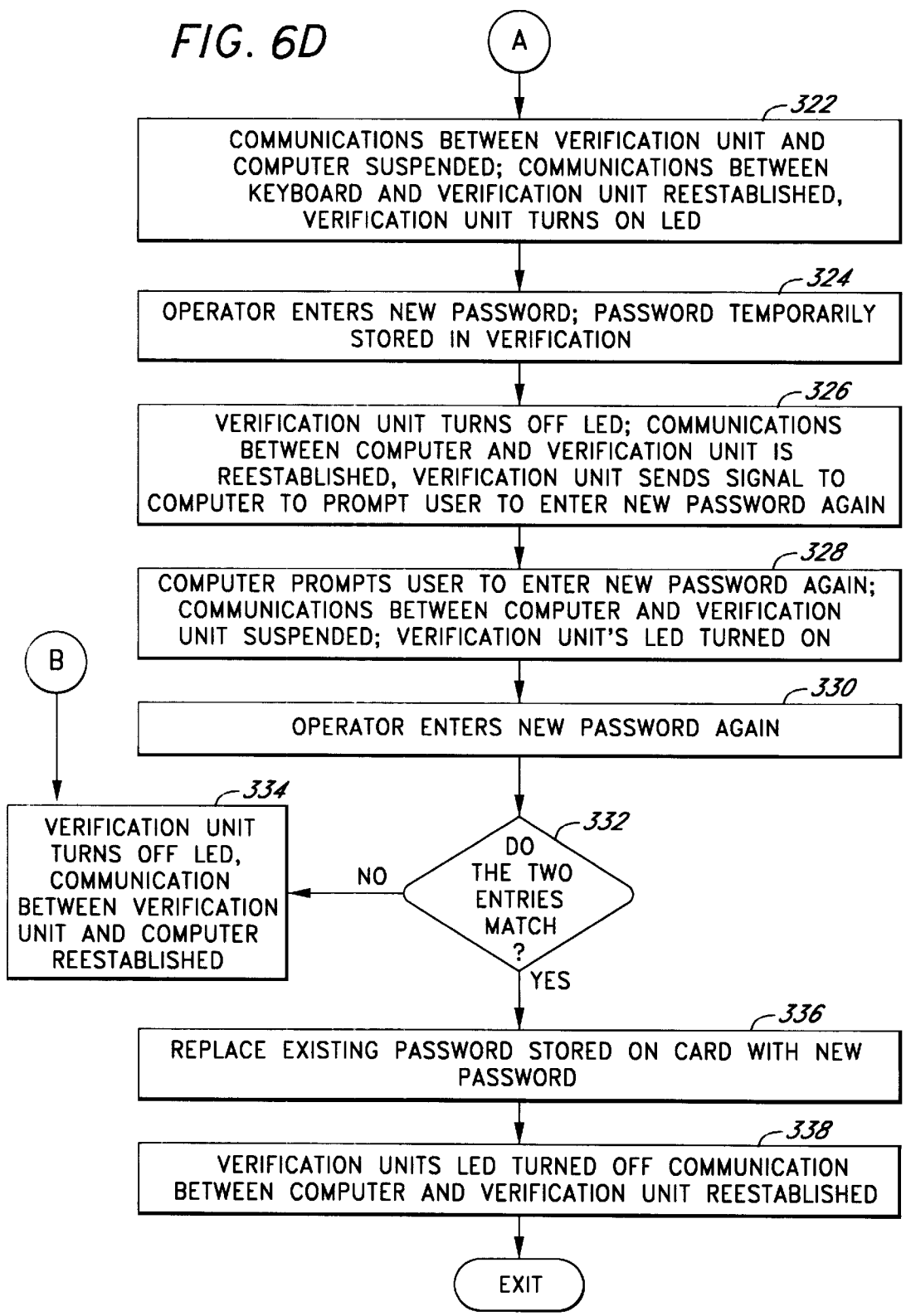

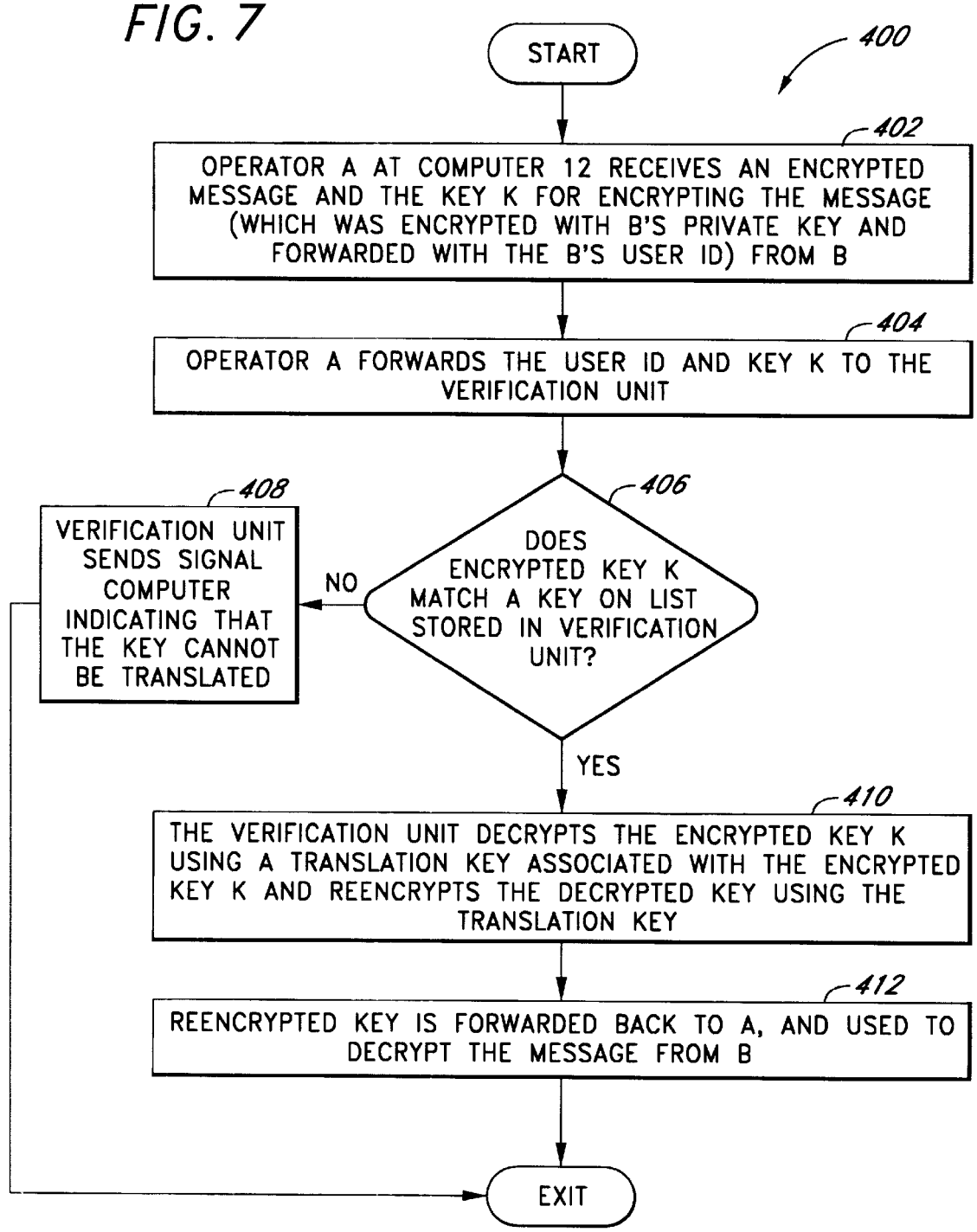

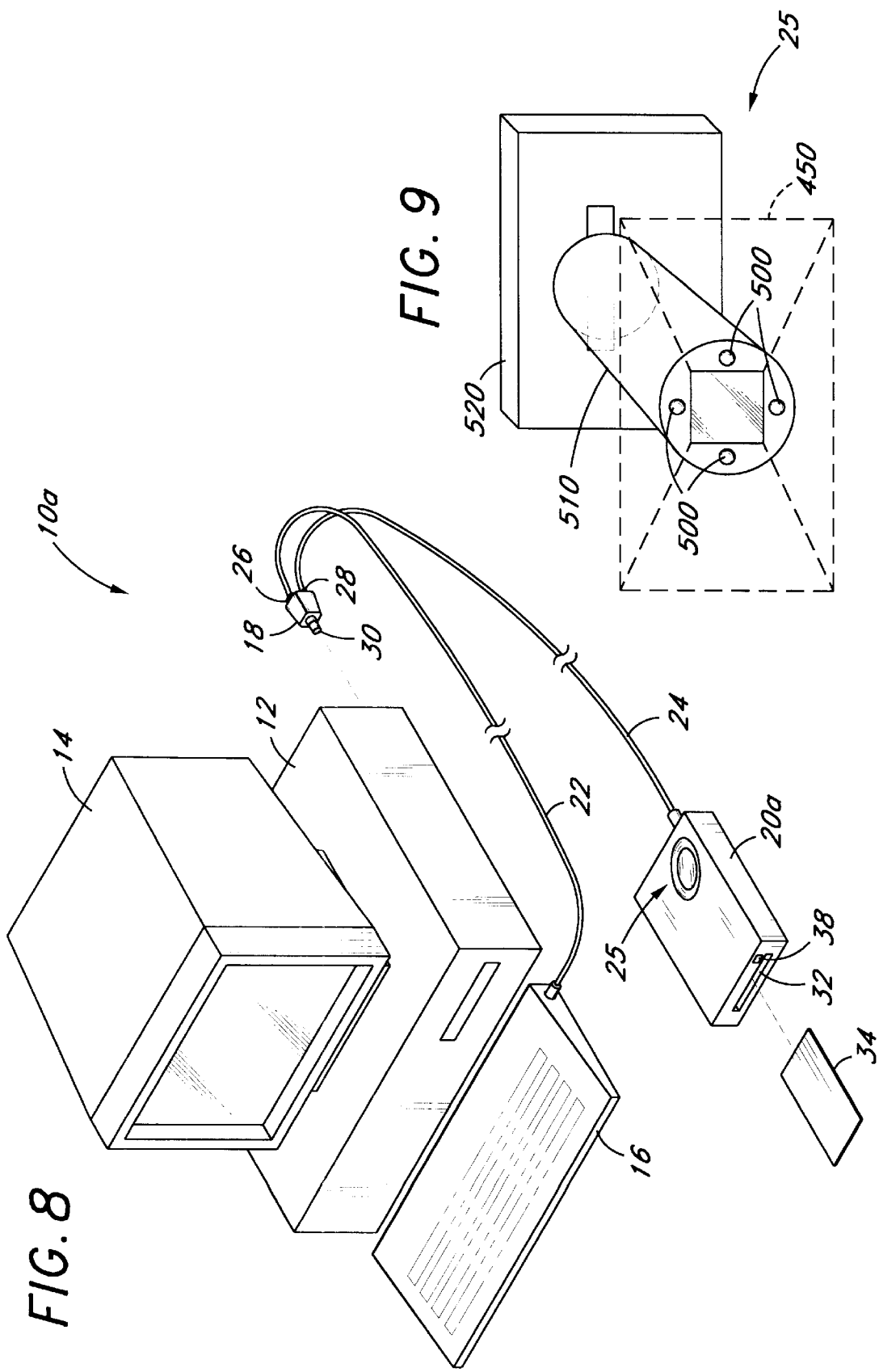

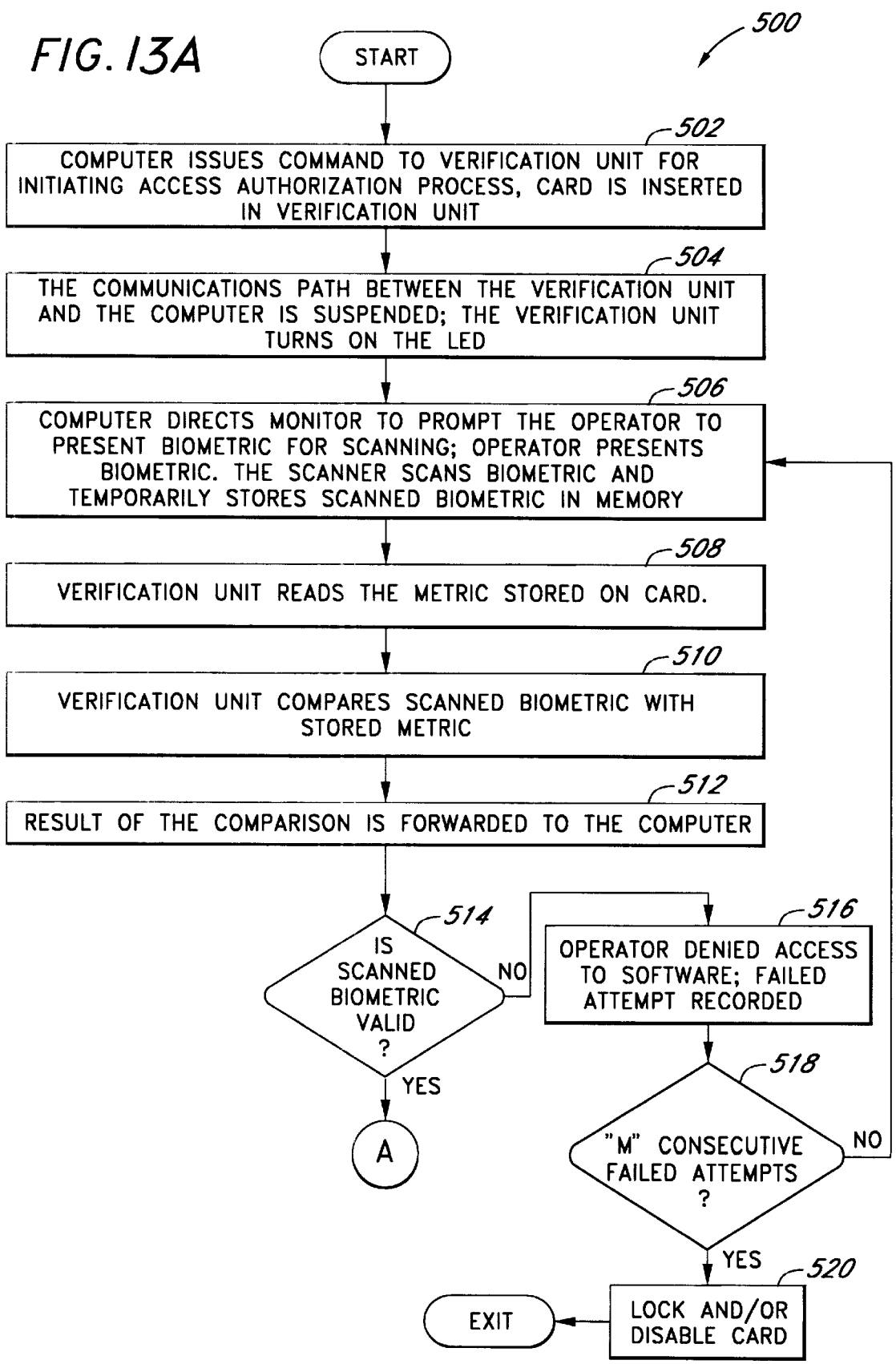

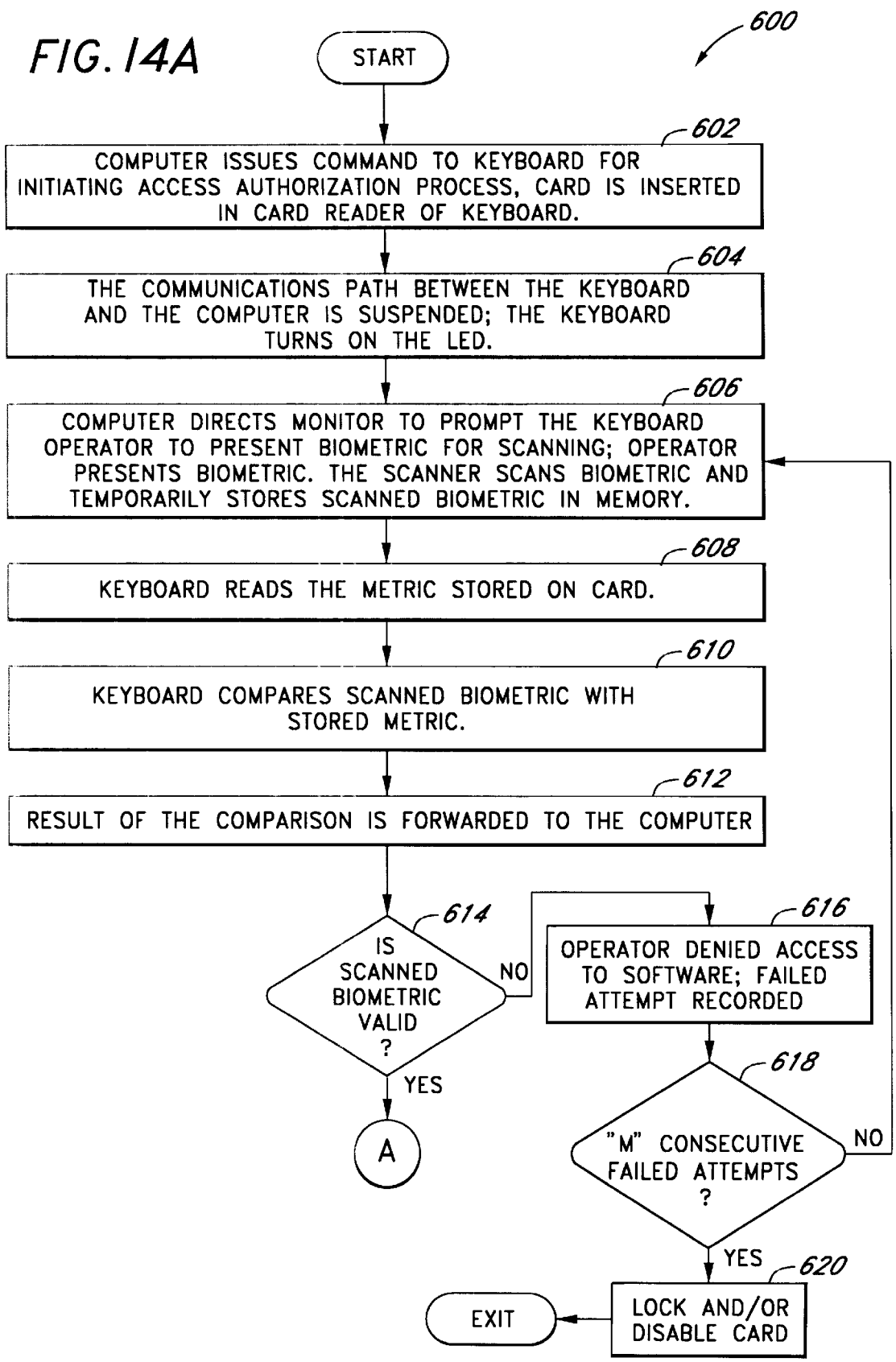

APPARATUS AND METHOD FOR PROVIDING AN AUTHENTICATION SYSTEM BASED ON BIOMETRICS

This Application is a Continuation-in-Part of application Ser. No. 08/744,363 filed Nov. 7, 1996, now U.S. Pat. No. 5,844,497.

BACKGROUND OF THE INVENTION

1. Field of the Invention

The present invention relates to information security devices, and more particularly to a method and apparatus of providing a secure authentication system utilizing a protected personal identification number (PIN) path. The present invention further relates to a method and apparatus of providing a secure authentication system using a protected personal identification data path.

2. Description of the Related Art

With the widespread use of computers, there is an increased need for controlling access to the computers and to the sensitive information stored within the computers. To provide additional security, cryptographic tokens, such as credit-card sized devices with built-in microprocessors and non-volatile memory are utilized in controlling access to computer systems. They are typically issued to a user with personalized information and private keying material and a personal access code, commonly known as a Personal Identification Number ("PIN"). The user must present a correct PIN to the card or to a device which reads the card, so as to unlock the card for operation. To compromise a card, a malicious user must be in physical possession of the card and also know the private PIN code. Since the PIN is typically entered directly into the computer, the security of such systems may still be compromised since the PIN may be captured by software specifically designed for the purpose.

One current approach to this problem is the use of an electro-mechanical device, or card reader, into which the user inserts the token. The device is, in turn, coupled to a computer. The user must enter his PIN directly into the card reader through a keypad mounted on the card reader. The card reader then verifies the PIN with the cryptographic key on the token. If the PIN is valid, a signal is sent to the computer, which authorizes access to the card's cryptographic information.

This approach however, present several disadvantages. First, the reader must provide the keypad, the keypad interface to the card reader's processor and the software for interpreting the user's entry. This feature adds to the complexity of the device and its cost. Secondly, a separate keyboard has to be used for accepting user input or commands to the computer. As a result, the user has to relocate from the keyboard to the keypad or vice versa. If repeated attempts at entering the PIN are required, such movement may prove distracting. The use of such a device is thus both awkward and expensive.

A second approach, as described in U.S. Pat. No. 5,406,624 (the "'624 patent"), involves the use of a security unit that is connected between a computer and keyboard. The security unit includes a processor which stores a number of security programs for operating the security unit, controlling attached peripherals and executing cryptographic algorithms. The security unit operates in one of two fundamental modes: a Transparent Mode in which data inputted from the keyboard to the security unit is transmitted to the computer, and a Special Handling Mode in which data entered from the keyboard is isolated from the computer so that the security unit assumes complete control of data provided via the keyboard. The Special Handling Mode in effect causes the security unit to replace the computer, executing security-related algorithms and in general, duplicating the operations of the computer in controlling the input, processing and displaying of information. The control means for selecting one of these modes involves downloading cryptographically signed software from the host computer and executing it within the security unit, or the use of a switch box connected between the security unit and the computer, which enables manual selection of the modes. In the '624 patent, security key operations are performed in the security unit. These security key operations include the verification of a program's signature, ciphering and deciphering of passwords and other like operations.

This second approach also presents several disadvantages. First, since the security and peripheral control programs executed by the security unit are of significant computational complexity, it requires a powerful processor and large amounts of memory to be effective. This processing requirement, and the control electronics for a variety of peripheral devices adds significant cost to the unit, placing it out of reach for a large number of potential users. Secondly, if the control means is implemented using downloadable software, an additional security risk is incurred since this software comes from an external source, which could be intercepted and compromised. The '624 device attempts to guard against this risk by requiring such software to be accompanied by a signature. However, this in turn limits the usefulness of the device for those applications which do not have the proper signature, and which do not have the knowledge (or code) required to interface with the security unit's processing system. If the control means is implemented using a manual switch, the operator has to be constantly interrupted to attend to the selection of the two modes, and may often find himself committing errors which hinder the effectiveness and the security of the unit.

Accordingly, there is a need in the technology for a simple, elegant and cost-effective consumer-level method and apparatus of authenticating a password or personal identification number (PIN) independently from the computer, so that access control to one or more application programs running on the computer may be enforced, while minimizing the risk of capture of the password by unauthorized users and also minimizing the complexity of user operation.

As discussed above, cryptographic tokens are typically issued to a user with personalized information, private keying material and a personal access code, commonly known as a Personal Identification Number ("PIN"). The correct PIN must be presented to the card or to a device which reads the card, so as to unlock the card for operation. The personal access code must be committed to memory and entered correctly before access control to one or more application programs running on a computer is available.

Accordingly, there is also a need for providing access control to one or more application programs running on the computer, while reducing the need for reliance on human memory in retrieving the personal access code, and also reducing human error in entering the personal access code to the authentication system.

BRIEF SUMMARY OF THE INVENTION

The present invention is a method and apparatus for controlling access to at least one program on a computer by verifying data entered through a scanner with data stored on a token such as a card, while isolating the entered data from the computer. The apparatus comprises a scanner, a memory, and a processor coupled to the scanner and memory. When activated, the scanner scans a field which the processor compares with a field stored in the memory. The processor is operable in a first mode wherein access to the computer via a keyboard is inhibited when the scanned field does not match the stored field. The processor is operable in a second mode, wherein the keyboard is coupled to the computer so that the at least one program on the computer is accessible via the keyboard when the scanned field matches the stored field. Various embodiments are disclosed.

The implementation of the present invention provides a simple, cost-effective and compact system that enforces access control for application programs running on a computer, while requiring minimal user relocation.

BRIEF DESCRIPTION OF THE DRAWINGS

The features and advantages of the present invention will become more readily apparent to those ordinarily skilled in the art after reviewing the following detailed description and accompanying drawings, wherein:

FIG. 4 is a flow chart of one embodiment of the access authorization process 100 of the present invention.

FIGS. 6A and 6B illustrate a flow chart of one embodiment of the user alteration process 250 of the present invention.

FIGS. 6C and 6D illustrate a flow chart of one embodiment of the password alteration process 300 of the present invention.

FIG. 7 is a flow chart of one embodiment of the key translation process 400 of the present invention.

FIG. 8 is a perspective view of a second embodiment of the authenticating system of the present invention.

FIG. 9 illustrates one embodiment of the scanner 25 of FIG. 8.

FIGS. 13A and 13B illustrate a flow chart of an alternate embodiment of the access authorization process of the present invention.

FIGS. 14A and 14B illustrate a flow chart of a third embodiment of the access authorization process of the present invention.

DETAILED DESCRIPTION OF THE INVENTION

Figure 1:
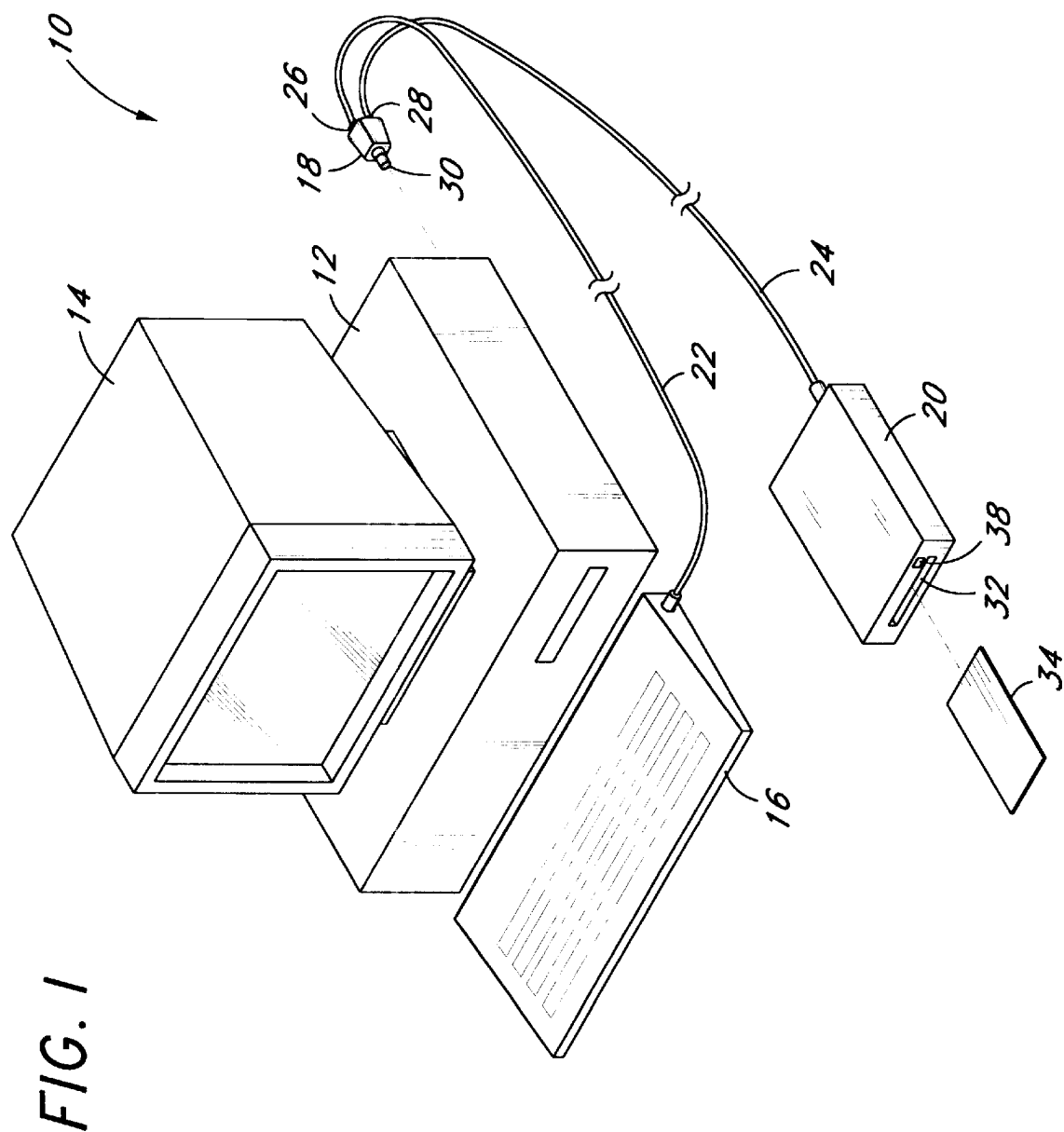
FIG. 1 is a perspective view of one embodiment of the authenticating system of the present invention.

FIG. 1 is a perspective view of the authenticating system 10 of the present invention. The authenticating system 10 comprises a computer 12, a monitor 14, a keyboard 16, a connector or an adapter 18 and a verification unit 20. The computer 12 may be a general purpose computer, a personal computer or a workstation. The computer 12 may also be connected to a network (not shown). The keyboard 16 is coupled to a first port 26 of the adapter 18 via a first cable 22. The verification unit 20 is coupled to a second port 28 of the adapter 18 via a second cable 24. The adapter 18 is in turn coupled to the computer 12 via a third port 30. The computer 12 supplies current and voltage to the keyboard 16 and the verification unit 20. However, the keyboard 16 only communicates with the computer 12 through the verification unit 20. The verification unit 20 has a slot 32 which receives a card 34, such as a smartcard, a PCMCIA card or some other personal security token. The verification unit 20 also has a light emitting diode (LED) 38 which is turned on to indicate that the verification unit 20 is ready to accept information from the keyboard 16 and that any information thus communicated will not be provided to the computer 12.

The authenticating system 10 functions under the control of one or more process access control software programs (PACS) residing in the computer 12 to enable the verification unit 20 to intercept and positively verify data such as a security identification number, a password, or a Personal Identification Number (PIN) of the operator requesting control of the application software. For discussion purposes, such data will be referred to as a password. This password is entered via the keyboard 16 and provided via the verification unit 20 to the card 34, which compares the entered password to a password previously stored on the card 34. Upon comparison of the passwords, the card 34 issues a "pass" or a "fail" signal via the verification unit 20 to the computer 12, which either grants or denies execution control of application software to the operator.

Once execution control of the application software has been granted to the user, the user may gain access to the software and/or alter the software accessed. In one embodiment, such application software includes one or more applications software programs residing in the computer 12. Examples of such applications software programs include: E-mail, Database Management Systems (DBMS), Web Browsers and Servers, Electronic Document Interchange/Electronic Fund Transfer (EDI/EFT) and local security programs. In one embodiment, different passwords may be used for obtaining access to different software programs in the computer 12. In another embodiment, a single password may be used for obtaining access to a plurality of software programs. In a further embodiment, a single password may be used to issue or generate additional unique passwords for obtaining access to a plurality of network applications.

Figure 2:
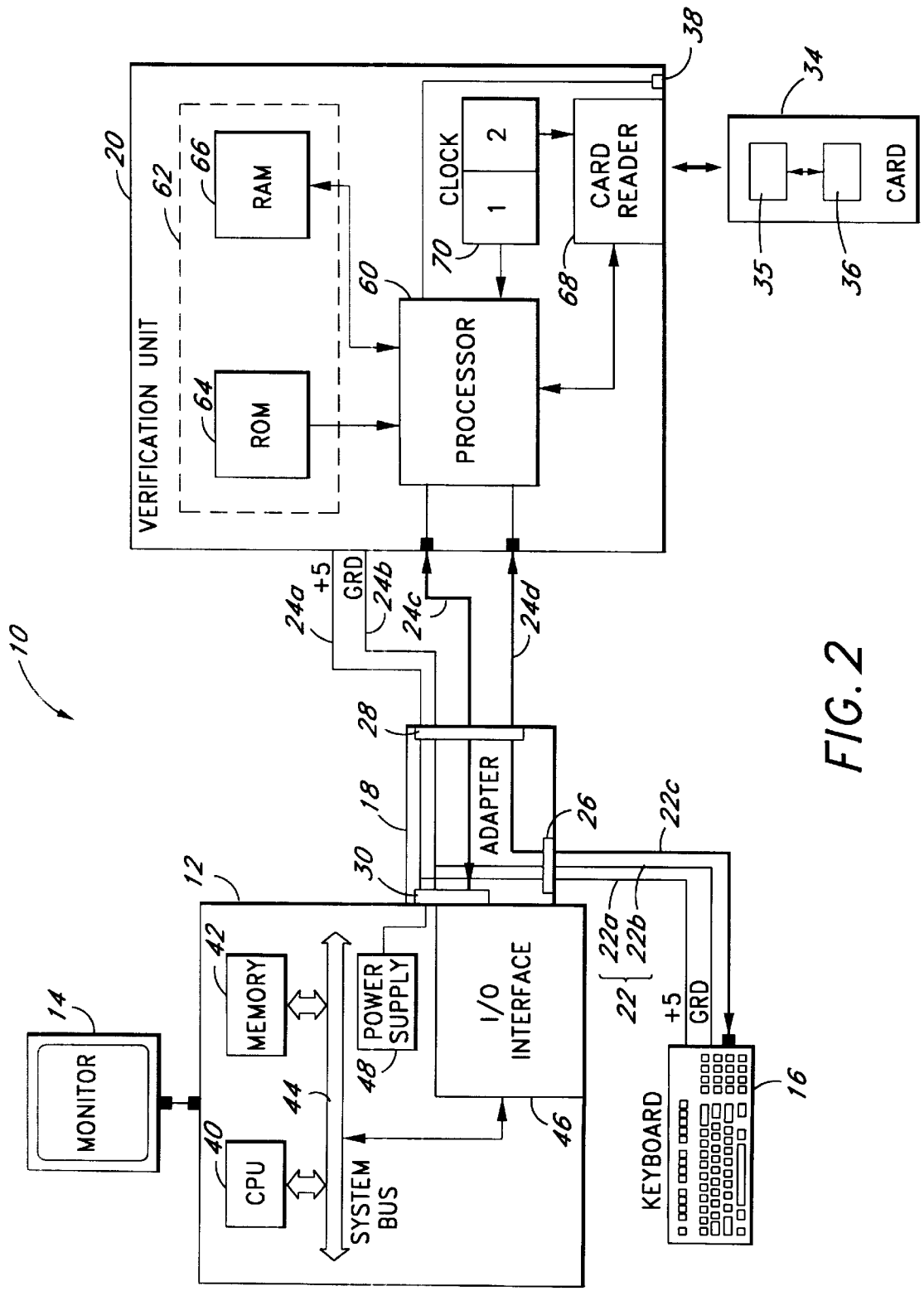
FIG. 2 is a block diagram of one embodiment of the authenticating system of FIG. 1.

FIG. 2 is a block diagram of the authenticating system 10 of FIG. 1. As shown, the computer 12 comprises a processor such as a CPU 40 and a memory module 42. The CPU 40 and memory module 42 are coupled to a system bus 44. The computer 12 also includes an input/output (I/O) interface 46 which is coupled the system bus 44. A power supply 48 supplies current and voltage to the computer 12.

Alternatively, the computer 12 may obtain its current and voltage supply externally, for example, from a wall unit.

The present invention is also described in reference to an operating system installed on the computer 12. The operating system supports process access control software (PACS) which enables application programs running on the CPU 40 to perform processes such as data base management, net browsing, electronic mail e-mail), firewalls, etc. The PACS also enables application programs running on the CPU 40 to control dispatch of commands to the verification unit 20.

As discussed earlier, the keyboard 16 and the verification unit 20 are coupled to the computer 12 through adapter 18. The keyboard 16 is coupled to a first port 26 of the adapter 18 via a first cable 22. The cable 22 comprises three lines, power line 22a, power line 22b and data line 22c. Power line 22a is coupled via adapter 18 to a power supply located in the computer 12, while power line 22b is coupled to ground. The third line 22c is a data line that is coupled through the adapter 18 to the verification unit 20, as discussed below.

The cable 24 comprises four lines, power lines 24a and 24b, and data lines 24c and 24d. Power line 24a is coupled to a power supply 48 (located in computer 12) via adapter 18, while power line 24b is coupled to ground. Data line 24c is coupled via adapter 18 to I/O interface 46 located in computer 12. Data line 24d is coupled to data line 22c (in cable 22) to keyboard 16. Thus, the computer 12 supplies current and voltage to the keyboard 16 and the verification unit 20. However, the keyboard 16 only communicates with the computer 12 through the verification unit 20, as described in detail in the following sections.

With reference to FIG. 2, the verification unit 20 comprises a processor 60 and a memory module 62 which includes both read only memory (ROM) 64 and random access memory (RAM) 66. The verification unit 20 further comprises a card reader/writer 68 which receives the card 34 through a slot 32 (see FIG. 1). A clock module 70 provides timing signals for the operation of the processor 60 and the card 34. In one embodiment, the clock module 70 comprises a single clock which provides timing signals for both the processor 60 and the operation of the card reader/writer 68. In another embodiment, the clock module 70 comprises two clocks, one for driving the processor 60 and the other for driving the operation of the card 34. The card 34 reads and/or writes data to or from the card 34. It also provides timing signals, ground and power to the card 34.

ROM 64 includes firmware which the processor 60 executes for monitoring the line 24c from the computer 12, lines 24d and 22c from the keyboard. This firmware performs read/write operations to/from the card 34 and the read/write operations to/from RAM 66, where RAM 66 is used as a temporary buffer for data inputs and outputs. The verification unit 20 further comprises a light emitting diode (LED) 38, which operates under control of the processor 60 to indicate that the access authorization procedure has been initiated, and that the communication path between the verification unit 20 (and thus the keyboard 16) and the computer 12 has been temporarily suspended. The LED 38 provides visual indication to the keyboard operator that they may securely enter their password via the keyboard 16. This prevents the password from being inadvertently provided to the computer 12.

Data entered via the keyboard 16 is transmitted to the verification unit 20 as scan codes, as is known in the technology. The verification unit 20 interprets the entered scan codes to identify the key the operator has pressed. As the scan codes are resolved, the characters are written to RAM 66. Once the user terminates the entry process, typically through depressing the ENTER key, software running on the processor 60 of the verification unit will encrypt the characters (password) written to RAM 66, read the encrypted password from the card 34 and compare the encrypted passwords. If the encrypted passwords match, the verification unit 20 has "authenticated" the user. It then returns a code indicating success or failure to the computer 12. Alternatively, the authentication process is performed by the card 34. In this case, upon receipt of the password, the verification unit 20 constructs the command code specified by the card 34 manufacturer for a "COMPARE PIN" command, append the password, and write this data to the card 34. The card 34 will then compare the password with the one stored in its non-volatile memory. If the passwords match, the card 34 has "authenticated" the user. It then returns a code indicating success or failure to the verification unit 20. In both cases, the number of consecutive failed attempts is recorded and the card 34 is disabled if a predetermined number (for example, 3 to 7) is reached.

Figure 3A:
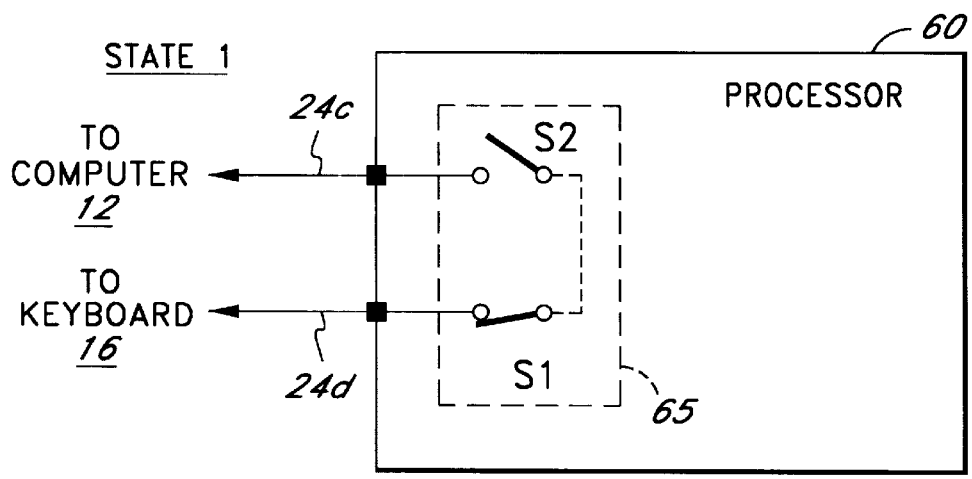
FIG. 3A illustrates one logical state of the processor in the verification unit, representative of one mode of operation in one embodiment of the verification unit.
Figure 3B:
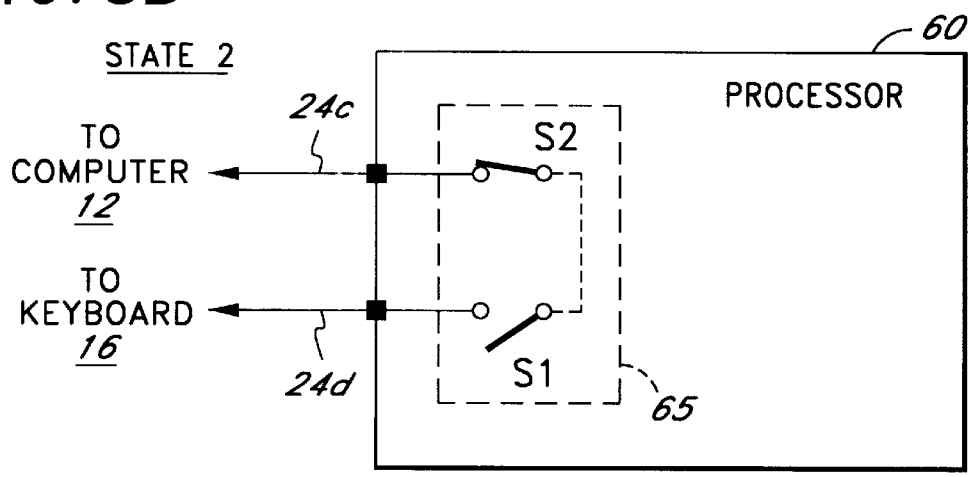
FIG. 3B illustrates a second logical state of the processor in the verification unit, representative of a second mode of operation in one embodiment of the verification unit.
Figure 3C:
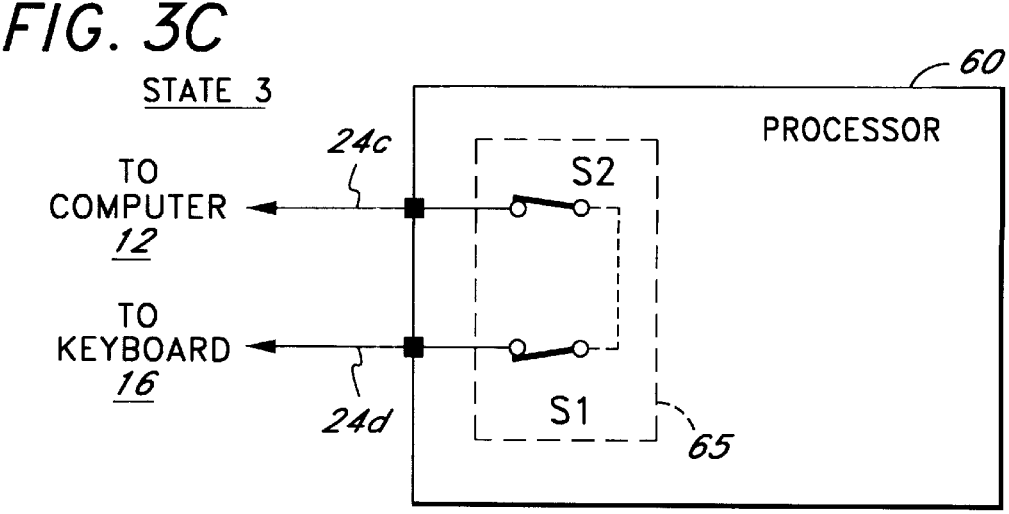
FIG. 3C illustrates a third logical state of the processor in the verification unit, representative of a third mode of operation in one embodiment of the verification unit.

The processor 60 further controls the communications between: (1) the keyboard 16 and the verification unit 20; (2) the keyboard 16 and the computer 12; and (3) the verification unit 20 and the computer 12. This is accomplished by porting data from: (1) the keyboard 16 to the verification unit 20 (or vice-versa); (2) the keyboard 16 to the computer 12 (or vice-versa); or (3) from the verification unit 20 to the computer 12 (or vice-versa), in response to commands issued by the CPU 40 in the computer 12. The porting of data from one unit (i.e., the keyboard 16, verification unit 20 or computer 12) to another unit as discussed above may be described with reference to a "logical switch" 65 as shown in FIGS. 3A–3C.

The logical switch 65 is used to illustrate the three states in which the processor 60 may operate in response to commands issued by the CPU 40. For purposes of discussion, the switch 65 has two switches, S1 and S2. In the first state, S1 is closed while S2 is open, so that there is only communication between the keyboard operator and the verification unit 20. When the processor 60 is in the first state, the LED 38 is turned on, indicating that it is safe for the operator to enter his password via the keyboard 16. In the second state, S1 is open, while S2 is closed. In this second state, there is communication only between the verification unit 20 and the computer 12. In the third state, S1 and S2 are both closed, so that an operator at the keyboard 12 may communicate with the computer 12 in a normal manner.

Thus, under the command of the CPU 40 in the computer 12, the verification unit 20 may intercept the password or Personal Identification Number (PIN) of the operator requesting control of the application software running on computer 12 and verify the password or PIN. This password is entered via the keyboard 16 and provided to the verification unit 20 when the processor 60 is operating in state 1. Upon receipt of the password from the keyboard 16, the verification unit 20 encrypts and temporarily stores the password in RAM 66. It then proceeds to read the encrypted password stored in the card 34 through card reader 68, and compares the encrypted password received from the card 34 with the encrypted password stored in RAM 66.

Upon comparison of the passwords, the verification unit 20 generates a status signal representing the result of the comparison and forwards it to the computer 12. The signal is issued when the processor 60 is operating under state 2. If the status signal indicates that the authentication was successful, i.e., the encrypted password from the keyboard 16 matches the encrypted password from the card 34, the computer 12 grants execution control of the application software to the operator. This is accomplished by issuing a command to the processor 60, which advances to state 3, where communications between the operator at the keyboard 12 and the computer 12 is established. The operator may then access and/or alter the application program(s) unlocked through the use of the password. If the encrypted password from the keyboard 16 did not match the encrypted password from the card 34, access to the computer 12 is denied. The processor 60 thus returns to state 1.

In an alternate embodiment, the password entered via the keyboard 16 is forwarded to the card 34, which compares the password to its internally stored password (state 1). Upon comparison of the passwords, card 34 generates a status signal representing the result of the comparison. The verification unit 20 receives the status signal and forwards it to the computer 12. The signal is issued when the processor 60 is operating under state 2. If the computer 12 grants execution control of the application software to the operator, the processor 60 advances to state 3, where communications between the operator at the keyboard 12 and the computer 12 is established. Otherwise, access to the computer 12 (or its application programs) is denied and the processor 60 returns to state 1.

FIG. 4 is a flow chart of the access authorization process 100 of the present invention. To gain access to a software application enabled with the PAC security application program interface, access authorization from the verification unit must first be obtained. This authorization is obtained as follows. Beginning from a start state, the process 100 proceeds to process block 102, where the PACS running on CPU 40 issues a command to the verification unit 20 for initiating access authorization. The card 34 may be inserted in the verification unit 20 at this time.

The verification unit 20 then proceeds to state 1, as shown in process block 104. In this state, S1 is closed while S2 is open, i.e., data is ported from the keyboard to the verification unit 20 and the communication path between the verification unit 20 and the computer 12 is suspended, which in turn suspends communication between the keyboard 16 and the computer 20. The verification unit 20 then turns on the LED 38, indicating that the path for entering the password is secure. The process 100 then advances to process block 106, where the CPU 40 directs the monitor 14 to display the message "Please enter password". The keyboard operator then enters his or her password via keyboard 16, which is provided to the verification unit 20 via line 22c, the adapter 18, and line 24d. The password is encrypted and temporarily stored in RAM 66.

The process 100 then advances to process block 108, where the verification unit 20 reads the encrypted password stored on the card 34 through the card reader 68. The encrypted password from the card 34 is temporarily stored in RAM 66. The process 100 then proceeds to process block 110, where the processor 60 in the verification unit 20 determines if the entered encrypted password is valid by comparing it to the encrypted password previously stored on the card 34. The result of the validation process is sent to the computer 12, as shown in process block 112. The process 100 advances to decision block 114, where the CPU 40 in computer 12 determines if result provided indicates that the entered password is valid. If the CPU 40 determines that the password is invalid, it issues a command to the processor 60 in the verification unit to remain in state 1, as shown in process block 116. The operator is thus denied access to the software on the computer 12. In addition, the failed attempt is recorded by the card 34.

The process 100 then proceeds to decision block 118, where the verification unit 20 determines if a predetermined number N of consecutive failed attempts have been recorded. If not, the process 100 returns to process block 106, where the operator is allowed another attempt at entering the correct password. If, however, the verification unit 20 determines that the predetermined number N of consecutive failed attempts has been reached, the process 100 proceeds to process block 120, where the card 34 is locked and/or permanently disabled. The process 100 then terminates. This feature of the verification unit 20 ensures that consecutive tries at guessing the password can be detected. In addition, this feature of the verification unit 20 provides additional security by locking and/or permanently disabling the card 34 after a predetermined number of consecutive failed attempts has occurred.

If, at decision block 114, the entered password is determined to be valid, the CPU 40 in computer 12 issues a command to the processor 60 in the verification unit 20 to direct the processor 60 to proceed to state 3, where communications between the keyboard and computer may be established, as shown in process block 122. The process 100 then terminates. Alternatively, the CPU 40 may prompt the keyboard operator to enter a second password, and process blocks 106–122 may be repeated to provide additional security. The application software program or programs accessed by the operator upon authentication of his entered password may be used to perform cryptographic operations, such as the decryption or encryption of messages.

As discussed earlier, in an alternate embodiment, the process 100 may, at process block 108, forward the entered password to the card 34 for comparison. In that case, the password is temporarily stored in memory 36 of the card 34. The processor 35 of the card then compares the entered password with its internally stored password. Upon comparison, the processor 35 issues a status signal to the verification unit 20, that is representative of the result of the search. The verification unit 20 than issues another signal to the computer 12 indicative of this result. The process 100 then proceeds as described above. It is understood by one skilled in the technology that the status signal may be implemented as a status bit or a flag that is forwarded from the card 34 to the verification unit 20 or from the verification unit 20 to the computer 12.

In one embodiment, the verification unit 20 can perform additional security functions for the protection of application programs running on the CPU 40 in computer 12, which is in turn coupled to a computer network or system. These functions include the creation and alteration of users who are authorized to use the application programs. Examples of such functions are illustrated in FIGS. 5A–5B and 6A–6D, and discussed in detail in the following sections. The additional security functions also involve the management of cipher keys that protect other keys and the generation of session keys that are sent to the PACS residing the CPU 40 for use in preparing classified documents and files. An example of key management provided by the verification unit 20 includes the translation of encrypted keys, as illustrated in FIG. 7 and as discussed in detail in the following sections.

Figure 5A:
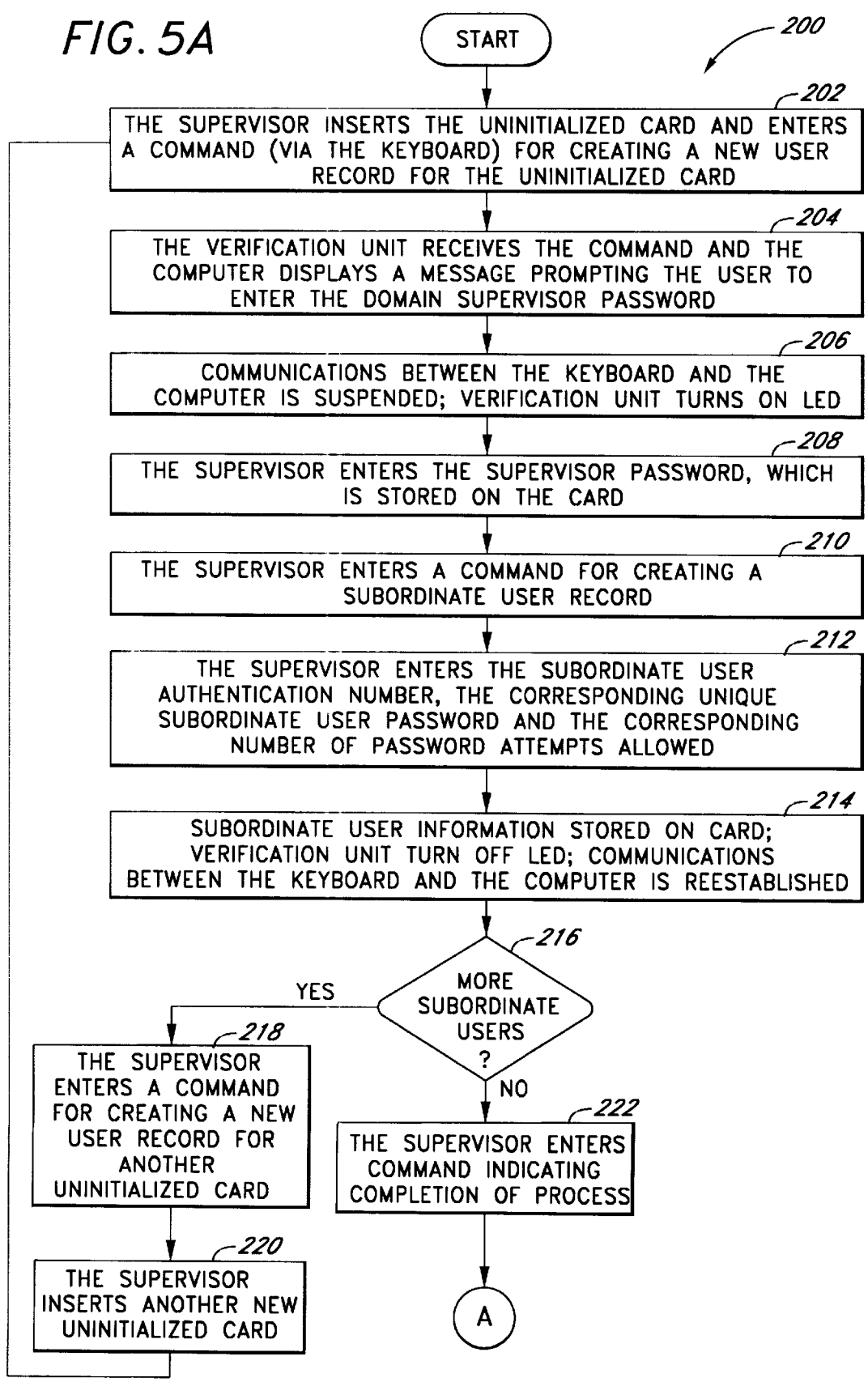
FIGS. 5A and 5B illustrate a flow chart of one embodiment of the process S200 of the present invention for creating a new user record for an uninitialized card.
Figure 5B:
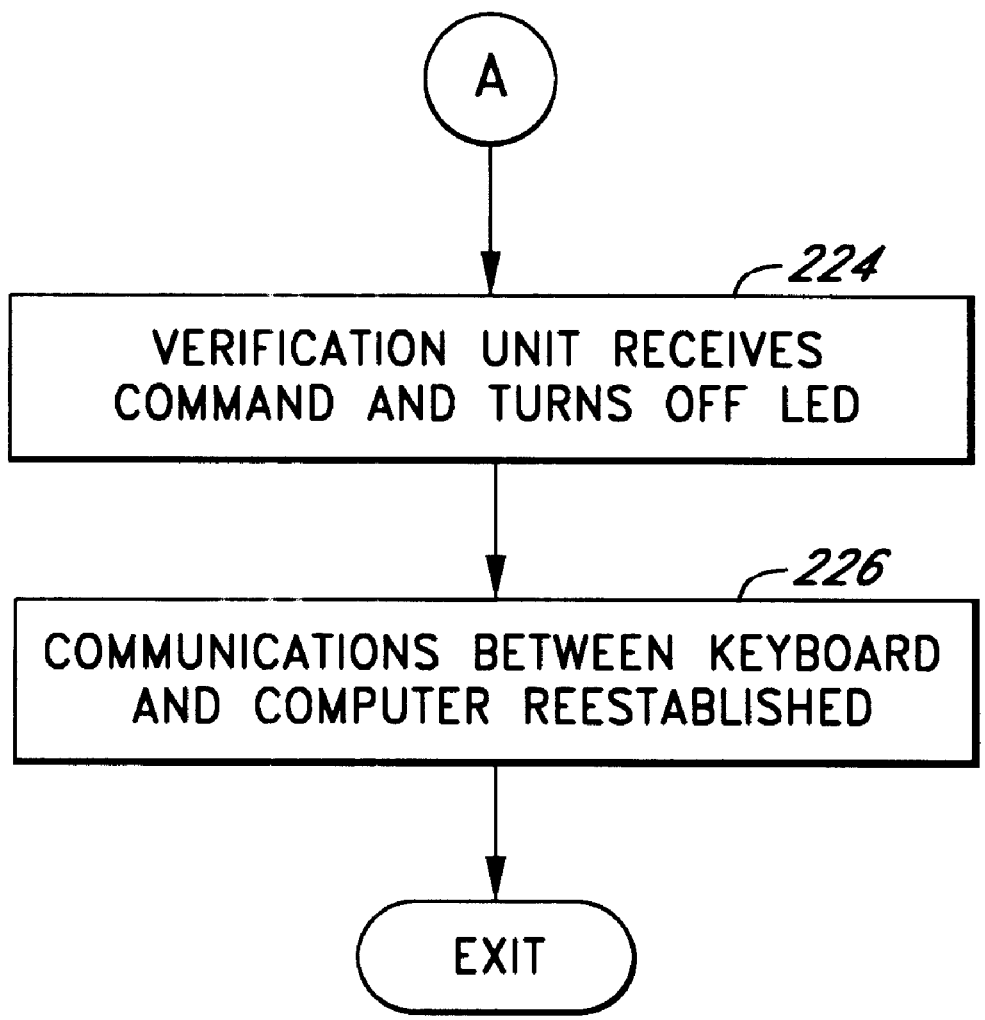

FIGS. 5A and 5B illustrate a flow chart of one embodiment of the process 200 of the present invention for creating a new user record. Upon receiving one or more uninitialized cards, an operator in a managing position, such as a supervisor, may utilize the verification unit 20 for creating new user record and to store the record on each card, such as card 34. The process 200 proceeds as follows. Beginning from a start state, the process 200 advances to process block 202, where the supervisor inserts the uninitialized card into the verification unit 20 and enters a command, via keyboard 16, for creating a new user record for the uninitialized card. The command thus entered may be entered by depressing a particular key on the keyboard 16, which is provided as a scan code to the verification unit 20.

Upon receiving the command, the verification unit 20 interprets the command or scancode to identify the key that the supervisor has entered. It then issues a signal to the computer 12 requesting the computer 12 to display a message prompting the supervisor to enter the supervisor password. The computer 12 responds by displaying this message (block 204). Communications between the keyboard 16 and the computer 12 is then suspended, and the verification unit 20 turns on the LED 38, indicating that the path for entering the password is secure (block 206). The supervisor then enters the supervisor password, which the verification unit 20 stores on the card (block 208).

Next, the supervisor enters a command for creating a subordinate user record (block 210). The supervisor first enters the subordinate user authentication number, followed by the corresponding unique subordinate user password and the corresponding number of password attempts allowed for gaining access to a particular program, or to the card 34 (block 212). When the supervisor has completed entering this information, he enters another command indicating such completion. The verification unit 20 then stores the subordinate user information on the card and then turns off the LED 38. Communications between the keyboard 16 and the computer 12 is then reestablished (block 214).

The process 200 then advances to decision block 216, where it determines if there are more uninitialized cards for which new user records have to be created. If so, the process 200 proceeds to process block 218, where the supervisor enters a command for creating another new user record for another uninitialized card. The process 200 then proceeds to process block 220, where the supervisor inserts another uninitialized card. The process 200 then proceeds back to process block 202 to repeat the blocks for creating a new user record.

If, at decision block 216, the process 200 determines that there are no other uninitialized cards for which new user records have to be created, the process 200 proceeds to process block 222, where the supervisor enters a command indicating the completion of the process 200. The process 200 then advances to process block 224, where the verification unit 20 receives the command and turns off the LED 38. Communications between the keyboard 16 and the computer 12 is then reestablished (block 226) and the process 200 terminates.

The process 200 illustrated in FIGS. 5A–5B and discussed above may be performed in an unsecured location, since the new user information is not provided to the computer 12 and cannot be captured or tampered with. However, the verification unit 20 may be configured to receive and write information regarding the new user to the card, such as card 34 without the use of a secure path. In this embodiment, the computer 12 utilized may be isolated and located in a secure room, so that the communications path between the keyboard 16 and the computer 12 need not be suspended during the entry and storage of the new user record.

After creating a new user record for a subordinate user, records may have to be updated, deleted or altered. This may be accomplished through the user alteration process 250 as shown in FIGS. 6A–6B. Beginning from a start state, the process 250 proceeds to process block 252, where the supervisor inserts the card with the information to be altered and enters a command for changing the subordinate authentication number. The process 250 then proceeds to process block 254, where the verification unit 20 receives the command and issues a signal to the computer 12, which prompts the supervisor to enter the supervisor password. Communications between the keyboard 16 and the computer 12 is then suspended, and the verification unit 20 turns on the LED 38, indicating that the path for entering the password is secure, as shown in process block 256. The supervisor then enters the supervisor password (block 258).

Upon receiving the supervisor password, the verification unit 20 compares the entered supervisor password with the supervisor password stored on the card 34, as shown in process block 260. The verification unit 20 then determines if the passwords match (decision block 262). If not, access to the subordinate user record and to the card, is denied. The process 250 then terminates.

If, at decision block 262, it is determined that the passwords match, the process 250 proceeds to process block 268, where verification unit 20 turns off the LED 38. Communications between the computer 12 and the verification unit 20 is reestablished, as shown in process block 270. The verification unit 20 then issues a signal to the computer 12 indicating that the passwords match and the computer 12 responds by prompting the supervisor to proceed with the desired change (block 272). The process 250 then advances to process block 274, where the communication path between the computer 12 and the verification unit 20 is suspended. At this juncture, the verification unit 20 turns on the LED 38, indicating that the path between the keyboard 16 and the verification unit 20 is secure.

The process 250 then proceeds to process block 276, where the supervisor enters the subordinate user's authentication number, and a command corresponding to the alteration or deletion of the user's authentication number. The process 250 then proceeds to process block 278, where the verification unit 20 deletes or alters the corresponding information. The altered information, if any, is then stored on the card 34. The process 250 then proceeds to process block 280, where the verification unit 20 turns off the LED 38 and communications between the computer 12 and the keyboard 16 is then reestablished. The process 250 then terminates.

FIGS. 6C–6D illustrate a flow chart of the password alteration process 300 of the present invention. This process 300 may be used by a supervisor or a subordinate user to alter his password. Beginning from a start state, the process 300 proceeds to process block 302, where the supervisor or the subordinate user inserts his or her card and enters a command for changing his or her password. The process 300 proceeds to process block 304, where the verification unit 20 issues a signal to the computer 12 indicating receipt of the command. The computer 12 responds by prompting the supervisor or subordinate user to enter the current password. Communications between the keyboard 16 and the computer 12 is then suspended, and the verification unit 20 turns on the LED 38, as shown in process block 306. The supervisor or subordinate user then enters the current password, as shown in process block 308. The verification unit 20 then compares the entered password with the password stored on the card 34, as shown in process block 310.

Next, the process 300 proceeds to decision block 312, where the verification unit 20 determines if the passwords match. If not, the password alteration process is denied to the operator, as shown in process block 314. The process 300 then terminates. If, at decision block 312, the verification unit 20 determines that the passwords match, the process 300 proceeds to process block 316, where communications between the verification unit and the computer 12 is reestablished, while communications between the verification unit 20 and the keyboard 16 remains inhibited. The process 300 then advances to process block 318, where the verification unit 20 sends a signal indicative of successful authentication of the entered password to the computer 12. The verification unit 20 then turns off the LED 38.

Next, the process 300 proceeds to process block 320, where the computer 12 prompts the operator to enter the new password. Communications between the verification unit 20 and the computer 12 is then suspended, while communications between the keyboard 16 and the verification unit 20 is reestablished, as shown in process block 322. The verification unit 20 then turns on the LED 38. The process 300 then proceeds to process block 324, where the operator enters the new password, which is temporarily stored in the RAM 66 of the verification unit 20. Next, the verification unit 20 turns off the LED 38 and the computer 12 prompts the operator to enter the new password again, as shown in process block 326. Communications between the verification unit 20 and the computer 12 is suspended, and the LED 38 is turned on again, as shown in process block 328. The operator then enters his new password again, as shown in process block 330. Control is then passed to decision block 332.

At decision block 332, the verification unit 20 determines if the two entries match. If not, the process 300 proceeds to process block 334, where the verification unit 20 turns off the LED 38 and communications between the computer 12 and the verification unit 20 is reestablished. The process 300 then returns to process block 320. If, at decision block 332, the verification unit 20 determines that the two entries match, the process 300 proceeds to process block 336, where the verification unit 20 replaces the password read from the card 34 with the new password. The verification unit 20 then turns off the LED 38 and communications between the computer 12 and the verification unit 20 is reestablished, as shown in process block 338. The process 300 then terminates.

FIG. 7 is a flow chart of the key translation process 400 of the present invention. Beginning from a start state, the process 400 proceeds to process block 402, where an operator A located at the computer 12 receives an encrypted message from an operator B at another computer (not shown). The operator A also receives a key K for encrypting the message from B, which was encrypted with B's private key and forwarded with B's user identification (ID). To encrypt the message, operator A forwards B's user identification and the encrypted key K to the verification unit 20 (block 404). The verification unit 20 then compares the encrypted key K with keys that are stored in the ROM 64 of the verification unit 20 (block 406). Each key on the list has a corresponding translation key which may be used in translating the encrypted key K. If the key K does not match any of the keys on the list, the process 400 proceeds to process block 408, where the verification unit 20 sends a signal to computer 12 indicating that there is no match. The computer 12 then displays a message indicating that the key K cannot be translated. The process 400 then terminates. If, at decision block 406, the verification unit 20 determines that the key K matches one of the keys on the list, the process 400 proceeds to process block 410, where the verification unit 20 decrypts the encrypted key K with the translation key associated with the matched key on the list, and re-encrypts the decrypted key using A's private key. The process 400 then proceeds to process block 412, where the re-encrypted key is forwarded back to A, and used to decrypt the message from B. The process 400 then terminates.

Other functions of the verification unit 20 include the management of cipher keys that protect other keys and the generation of session keys that are sent to the PACS residing the CPU 40 for use in preparing classified documents and files. Examples of such functions include the generation of a random number and the enciphering or deciphering of data, which are discussed in detail in the following sections.

Upon request by the operator or by an application program running on the computer 12, the verification unit 20 may generate a random number, which is provided to the computer 12. The random number may be used to encrypt messages or other keys. Since the program which generates random numbers on the computer 12 may easily be captured or emulated, this aspect of the present invention permits provides a secure means of providing session keys. The random number thus generated may also be stored on the card 34 and subsequently used to encrypt other keys.

The verification unit 20 may also encipher data provided from the computer 12, upon request from the operator or by an application program running on the computer 12. For example, a command representative of such a request is first entered by the keyboard operator. The data to be enciphered is forwarded from the computer 12 to the verification unit 20. Upon receipt of this data, the verification unit 20 enciphers it using one of a plurality of keys stored in its memory 62. The enciphered data is then returned to the computer 12.

Likewise, the verification unit 20 may decipher data provided from the computer 12, upon request from the operator. In this case, the operator must first be authenticated, using process 100 as described above. When authenticated, the operator issues a command to the verification unit, requesting the deciphering of a block of data. The data to be deciphered, along with a key identification number which identifies the key to be used for deciphering (located in the verification unit 20), are then provided to the verification unit 20. Upon receipt of this information, the verification unit 20 deciphers the data and then sends the deciphered data back to the computer 12.

The implementation of the present invention provides a simple, cost-effective and compact system that enforces access control to one or more application programs running on a computer, while requiring minimal user relocation. The implementation of the present invention authenticates passwords for accessing such application programs while ensuring that the passwords will not be tampered with by software running on the computer. The present invention also facilitates the creation and alteration of users who are authorized to use the application programs. In addition, the present invention provides a number of security functions for the protection of application programs running on the computer. These functions involve the management of cipher keys that protect other keys and the generation of session keys that are sent to the computer for use in preparing classified documents and files.

Thus, the present invention provides a simple, elegant and cost-effective consumer-level method and apparatus of authenticating a password or personal identification number (PIN) independently from the computer, so that access control to one or more application programs running on the computer may be enforced, while minimizing the risk of capture of the password by unauthorized users and also minimizing the complexity of user operation. Due to the cost-effective and compact features of the present invention, the verification unit 20 may readily be utilized in consumer-level applications such as home-banking.

The authentication system described above may also be configured to authenticate personal identification data, such as biometric features of a user. The term "biometric" as used herein refers to a substantially stable physical characteristic of a person, which can be automatically measured and characterized for comparison. Such biometrics include fingerprints, palm prints, retinal prints, and facial characteristics. Biometrics may also include behavioral characteristics, such as the manner in which a person writs his or her signature. The term "metric" as used herein refers to a set of data which can be automatically compared to the scanned biometric. A metric may be a recorded digital image of the biometric which is compared to the scanned biometric by cross-correlation. More typically a metric is a recorded set of characteristics or measurements which can be repeated on the scanned biometric and compared with the recorded set. Automatic comparison of human biometrics is known by one of skill in the art and is discussed in "Vital Signs of Identity", IEEE Spectrum, pages 22–30, February 94, and is incorporated herein by reference.

FIG. 8 is a perspective view of a second embodiment of the authenticating system of the present invention. The authentication system 10*a* of FIG. 8 is identical to the authentication system 10 of FIG. 1, with the exception that the verification unit 20*a* further comprises a scanner 25. In an alternate embodiment, the verification unit 20*a* further comprises a scanner 25 and a scanner interface circuit 27 (see FIG. 10). In one embodiment, the scanner 25 is a biometric scanner. The scanner 25 scans a field in which scannable indicia or a biometric, such as a fingerprint, may be presented. In one embodiment, the scanner interface circuit 27 is a data processing circuit that is further coupled to other input/output devices such as a printer, a transmitter and/or an auxiliary data input.

In one alternate embodiment, the scanner 25 is located external to the verification device 20*a*. In this case, biometric data is forwarded to the verification device 20*a* for comparison with a metric that is stored either in RAM 84*b* on the verification device 20*a* or in memory 36 of the card 34.

FIG. 9 illustrates one embodiment of the scanner 25 of FIG. 8. The scanner 25 comprises conventional optics 510 which focus the field 450 onto a charge coupled device (CCD) 520. The CCD 520 generates a digital signal representative of the field 450 in a manner that is known by one of skill in the art. The scanner 25 may also include light emitting diodes (LEDs) 500 or other sources of illumination generally known to one of ordinary skill in the art, to illuminate the field 450, if necessary.

Figure 10:
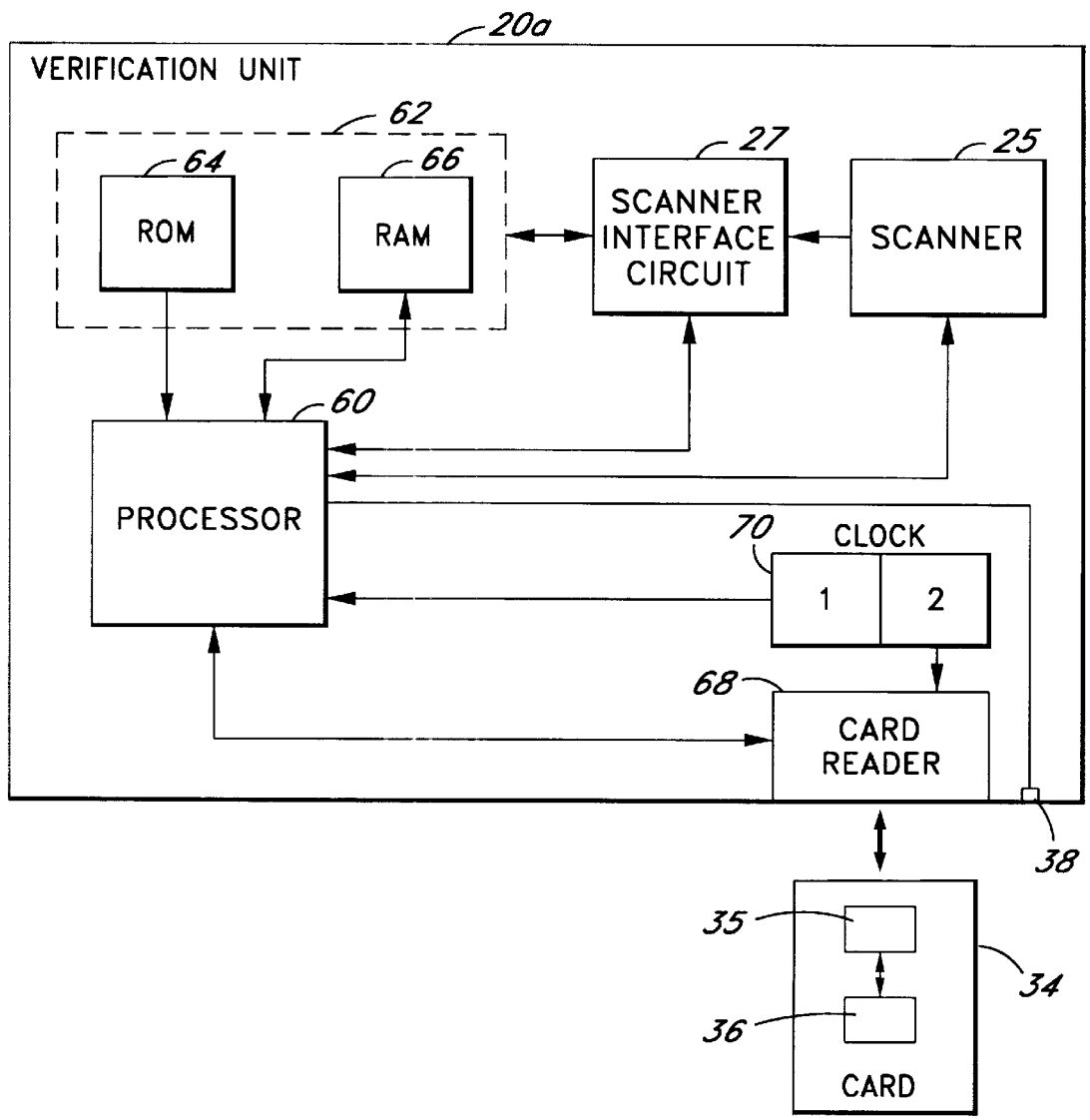
FIG. 10 illustrates a block diagram of one embodiment of the verification unit of FIG. 8.

FIG. 10 illustrates a block diagram of one embodiment of the verification unit 20*a* of FIG. 8. The verification unit 20*a* is substantially identical to the verification unit 20 as shown in FIG. 2, with the exception that it further comprises a scanner 25. In an alternate embodiment, the verification unit 20*a* comprises a scanner 25 and a scanner interface circuit 27. Upon scanning a field (such as field 450 as shown in FIG. 9), the scanner 25 generates a signal representative of the field scanned. The signal is provided to the processor 60, which compares the scanned indicia or biometric with a metric stored in RAM 66. If there is a match, the processor 60 issues a validation signal that is provided either to the verification unit 20 or to the computer 12. Otherwise, a error signal is generated.

Techniques for validating various biometric characteristics are well known. For example, the article "Vital signs of Identity" describes numerous commercially available systems for recognizing fingerprints, hand geometry and signatures. Accordingly, a person of ordinary skill in the art can readily implement such recognition techniques.

The signal generated by the scanner 25 is also provided to the scanner interface circuit 27. The scanner interface circuit 27 is coupled to memory 62 and processor 60. In one embodiment, the scanner interface circuit 27 is also coupled to a printer (not shown), which may be configured to print a hard copy record of a transaction. In an alternate embodiment, the scanner interface circuit 27 is connected to an auxiliary data input (not shown) for inputting data.

Figure 11:
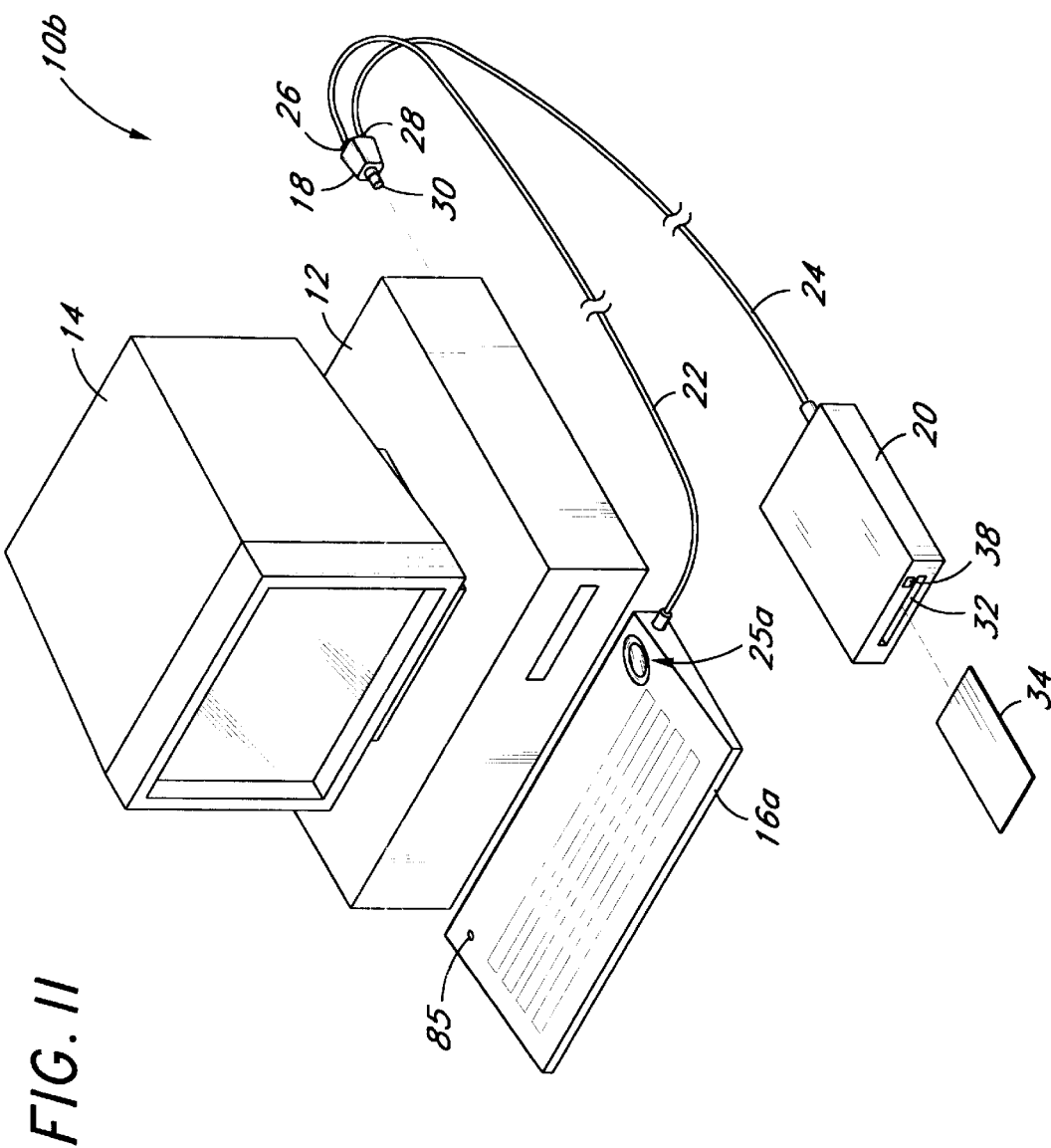
FIG. 11 is a perspective view of a third embodiment of the authenticating system of the present invention.

FIG. 11 is a perspective view of a third embodiment of the authenticating system of the present invention. The authentication system 10*b* of FIG. 11 is substantially identical to the authentication system 10 of FIG. 1, with the exception that the keyboard 16*a* further comprises a scanner 25*a*. In one embodiment, the scanner 25*a* is identical to the scanner 25 of FIG. 9. In an alternate embodiment, the keyboard 16*a* further comprises the scanner 25 and a scanner interface circuit 27 (see FIG. 12A).

Figure 12A:
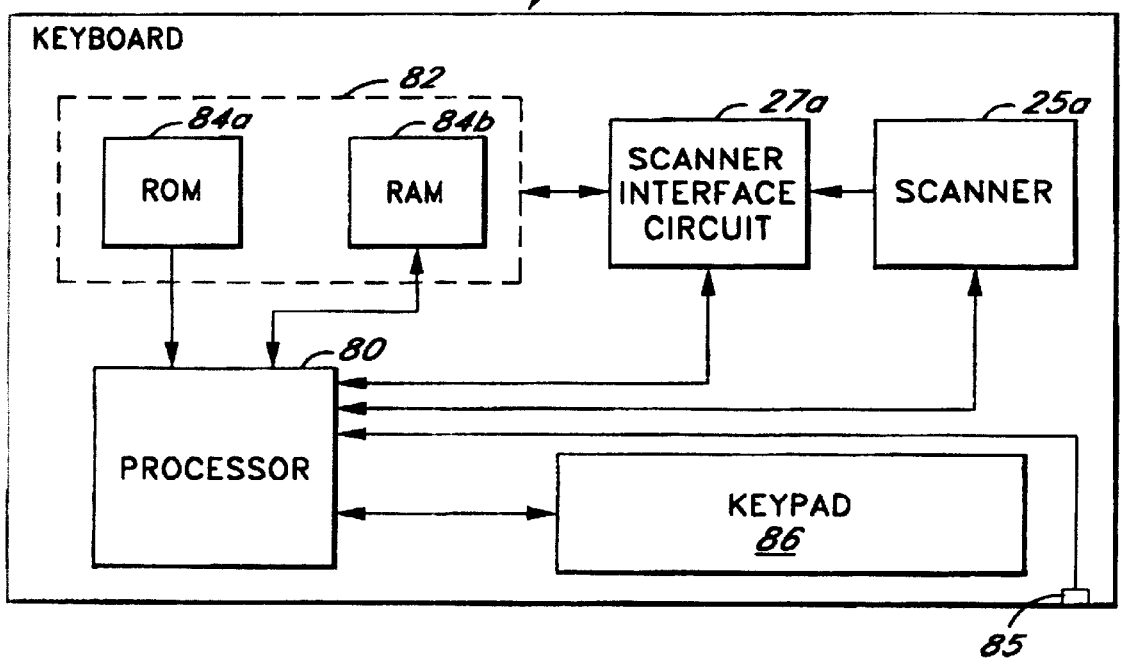
FIG. 12A illustrates a block diagram of one embodiment of the verification unit of FIG. 11.

FIG. 12A illustrates a block diagram of one embodiment of the keyboard 16*a* of FIG. 11. The keyboard 16*a* comprises a processor 80 and a memory module 82 which includes both read only memory (ROM) 84*a* and random access memory (RAM) 84*b*. The keyboard 16*a* also comprises a keypad 86 that is coupled to the processor 80. In addition, the keyboard 16*a* comprises the scanner 25*a*. In one embodiment, the keyboard 16*a* further comprises the scanner 25*a* and a scanner interface circuit 27*a*.

ROM 84*a* includes firmware which the processor 80 executes for monitoring the line 22 from the keyboard 16*a*. This firmware performs read/write operations to/from RAM 84*b*, where RAM 84*b* is used as a temporary buffer for data inputs and outputs.

In the embodiment of FIG. 12A, the scanned indicia or biometric is converted into a signal representative of the indicia or biometric scanned. The signal is provided to the processor 80, which compares the scanned indicia or biometric with a metric stored in RAM 84*b*. If there is a match, the processor 80 issues a validation signal that is provided either to the verification unit 20 or to the computer 12. Otherwise, a error signal is generated.

Figure 12B:
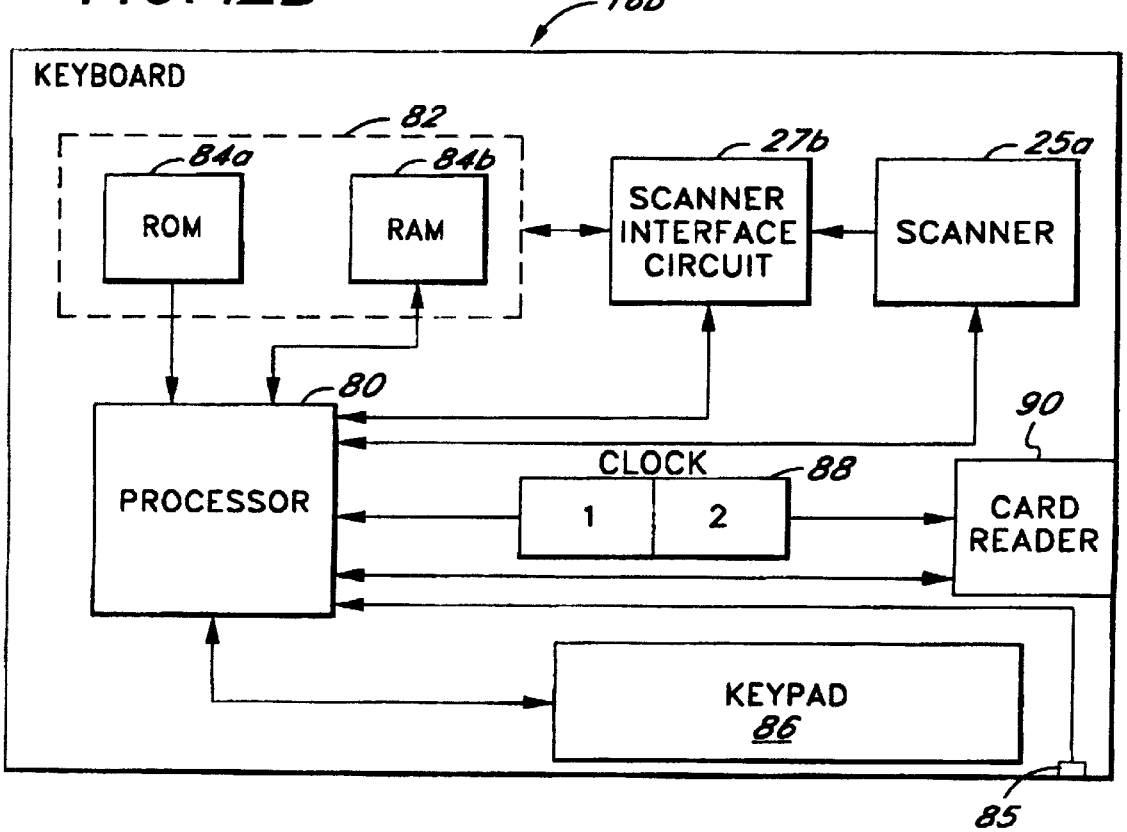
FIG. 12B illustrates a block diagram of an alternate embodiment of the verification unit of FIG. 11.

FIG. 12B illustrates a block diagram of an alternate embodiment of the keyboard 16*b* of FIG. 11. The keyboard 16*b* is substantially identical to the keyboard 16*a* of FIG. 12A, with the exception that it further comprises a card reader/writer 90 which receives a card such as card 34 through a slot (not shown). The card reader/writer 90 reads and/or writes data to or from the card 34. A clock module 88 provides timing signals for the operation of the processor 80 and the card 34. In one embodiment, the clock module 88 comprises a single clock which provides timing signals for both the processor 80 and the operation of the card reader/writer 90. In another embodiment, the clock module 88 comprises two clocks, one for driving the processor 80 and the other for driving the operation of the card 34. The keyboard 16*b* also provides ground and power to the card 34.

In the embodiment of FIG. 12B, the scanned indicia or biometric is converted into a signal representative of the indicia or biometric scanned. The signal is provided to the processor 80, which compares the scanned indicia or biometric with a metric stored in RAM 84*b* or with a metric stored in the memory e.g., memory 36 of a card, such as card 34. In the first case (i.e., where the metric is stored in RAM 84*b*), the processor 80 issues a validation signal if there is a match. Otherwise, a error signal is generated. In the second case (i.e., where the metric is stored in the memory of the card), the processor e.g., processor 35 located on the card 34 issues a validation signal, which is forwarded to the processor 80, which subsequently generates a validation signal that is provided either to the verification unit 20 or to the computer 12.

In a further embodiment, the scanner 25 may be located external to the keyboard 16*a* or 16*b*, and is coupled to the keyboard 16*a* or 16*b* via a signal line. In this case, the scanner 25 performs the same function as the scanner of FIG. 12A. In another embodiment, the keyboard 16*a* or 16*b* does not include the processor 80 or memory module 82, so that signals provided from the scanner 25*a* (which may be located internal or external to the keyboard 16*a* or 16*b*) are forwarded to the verification device 20 (FIG. 1) via the keyboard 16. In this case, the scanner 25 forwards the biometric data to any one of: (1) the card inserted in the card reader 90 of keyboard 90 (FIG. 12B), (2) the verification device 20 (FIG. 1), or (3) the card 34 inserted in the verification device 20 (FIG. 1), for verification.

Figure 13B:
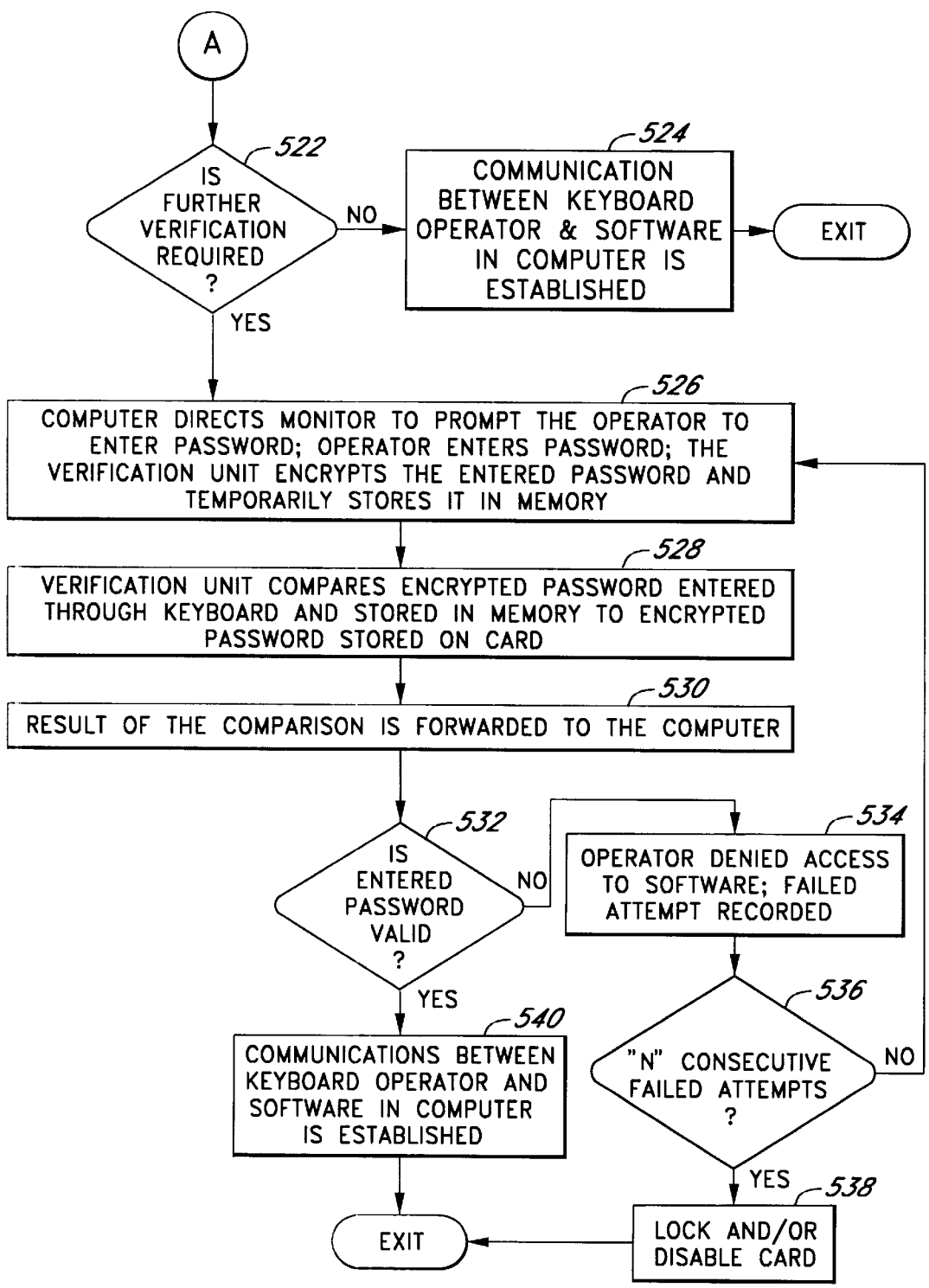

FIGS. 13A and 13B illustrate a flow chart of an alternate embodiment of the access authorization process of the present invention. For a two-factor verification process, in which the scanned biometric is compared with a stored metric, the process 500 may be implemented using any one of: the verification unit 20*a* (FIG. 10); the keyboard 16*a* (FIG. 12A) in conjunction with the verification unit 20 (FIG. 2); the verification unit 20 in conjunction with an external scanner that is coupled to the verification unit 20; or with the keyboard 16 (FIG. 2) in conjunction with an external scanner that is coupled to the verification unit 20. For a three-factor verification process, in which the scanned biometric is compared with a stored metric, and an entered password is compared to a stored password, the process 500 may be implemented using any one of: the keyboard 16 (FIG. 2) in conjunction with the verification unit 20*a* (FIG. 10); the keyboard 16*a* (FIG. 12A) in conjunction with the verification unit 20 (FIG. 2); the keyboard 16 and the verification unit 20 in conjunction with an external scanner that is coupled to the verification unit 20; or with the keyboard 16 (FIG. 2) in conjunction with an external scanner that is coupled to the verification unit 20, and the verification unit 20. In alternate embodiments, various combinations of the keyboard 16, 16*a* and 16*b*, the verification unit 20, 20*a* and the scanner 25 may be implemented to perform the process 500 in accordance with the principles of the present invention. For present discussion purposes, the verification unit 20*a* and the keyboard 16 will be referred to in the following sections. In addition, although a biometric is referred to in the process 500, it is understood that other scannable indicia may also be used in implementing the access authorization process.

To gain access to a software application enabled with the PAC security application program interface, access authorization from the verification unit 20*a* must first be obtained. This authorization is obtained as follows. Beginning from a start state, the process 500 proceeds to process block 502, where the PACS running on CPU 40 in computer 12 issues a command to the verification unit 20*a* for initiating access authorization. The card 34 may be inserted in the verification unit 20*a* at this time.

The verification unit 20*a* then proceeds to state 1, as shown in process block 504. In this state, S1 is closed while S2 is open, i.e., data is ported from the keyboard to the verification unit 20*a* and the communication path between the verification unit 20*a* and the computer 12 is suspended, which in turn suspends communication between the keyboard 16 and the computer 20. The verification unit 20*a* then turns on the LED 38, indicating that the path for entering the biometric is secure. The process 500 then advances to process block 506, where the CPU 40 directs the monitor 14 to display the message "Please present biometric". The operator then presents his or her biometric for scanning by scanner 25. The scanner 25 scans the biometric and temporarily stores the scanned biometric in RAM 66.

The process 500 then advances to process block 508, where the verification unit 20 reads the metric stored on the card 34 through the card reader 68. The metric from the card 34 is temporarily stored in RAM 66. The process 500 then proceeds to process block 510, where the processor 60 in the verification unit 20 determines if the scanned biometric is valid by comparing it to the metric previously stored on the card 34. The result of the validation process is sent to the computer 12, as shown in process block 512. The process 500 advances to decision block 514, where the CPU 40 in computer 12 determines if result provided indicates that the scanned biometric is valid. If the CPU 40 determines that the password is invalid, it issues a command to the processor 60 in the verification unit 20*a* to remain in state 1, as shown in process block 516. The operator is thus denied access to the software on the computer 12. In addition, the failed attempt is recorded by the card 34.

The process 500 then proceeds to decision block 518, where the verification unit 20*a* determines if a predetermined number M of consecutive failed attempts have been recorded. If not, the process 500 returns to process block 506, where the operator is allowed another attempt at entering the correct password. If, however, the verification unit 20*a* determines that the predetermined number M of consecutive failed attempts has been reached, the process 500 proceeds to process block 520, where the card 34 is locked and/or permanently disabled. The process 500 then terminates. This feature of the verification unit 20*a* ensures that consecutive tries at guessing the password can be detected. In addition, this feature of the verification unit 20*a* provides additional security by locking and/or permanently disabling the card 34 after a predetermined number of consecutive failed attempts has occurred.

If, at decision block 514, the scanned biometric is determined to be valid, the process 500 determines if further verification is required, as shown in decision block 522. If not, the CPU 40 in computer 12 issues a command to the processor 60 in the verification unit 20*a* to direct the processor 60 to proceed to state 3, where communications between the keyboard 16 and computer 12 may be established, as shown in process block 524. The process 500 then terminates.

If further verification is required, the process 500 proceeds to process block 526, where the CPU 40 directs the monitor 14 to display the message "Please enter password". The keyboard operator then enters his or her password via keyboard 16, which is provided to the verification unit 20*a* via line 22*c*, the adapter 18, and line 24*d* (see FIG. 2 and FIG. 10). The password is encrypted and temporarily stored in RAM 66.

The process 500 then advances to process block 528, where the verification unit 20*a* reads the encrypted password stored on the card 34 through the card reader 68. The encrypted password from the card 34 is temporarily stored in RAM 66. The process 500 then proceeds to process block 528, where the processor 60 in the verification unit 20a determines if the entered encrypted password is valid by comparing it to the encrypted password previously stored on the card 34. The result of the validation process is sent to the computer 12, as shown in process block 530. The process 500 advances to decision block 530, where the CPU 40 in computer 12 determines if result provided indicates that the entered password is valid. If the CPU 40 determines that the password is invalid, it issues a command to the processor 60 in the verification unit 20a to remain in state 1, as shown in process block 534. The operator is thus denied access to the software on the computer 12. In addition, the failed attempt is recorded by the card 34.

The process 500 then proceeds to decision block 536, where the verification unit 20a determines if a predetermined number N of consecutive failed attempts have been recorded. If not, the process 500 returns to process block 526, where the operator is allowed another attempt at entering the correct password. If, however, the verification unit 20a determines that the predetermined number N of consecutive failed attempts has been reached, the process 500 proceeds to process block 538, where the card 34 is locked and/or permanently disabled. The process 500 then terminates. This feature of the verification unit 20a ensures that consecutive tries at guessing the password can be detected. In addition, this feature of the verification unit 20a provides additional security by locking and/or permanently disabling the card 34 after a predetermined number of consecutive failed attempts has occurred.

If, at decision block 532, the entered password is determined to be valid, the CPU 40 in computer 12 issues a command to the processor 60 in the verification unit 20a to direct the processor 60 to proceed to state 3, where communications between the keyboard and computer may be established, as shown in process block 540. The process 500 then terminates. Alternatively, the CPU 40 may prompt the keyboard operator to enter a second password, and process blocks 526–540 may be repeated to provide additional security. The application software program or programs accessed by the operator upon authentication of his entered password may be used to perform cryptographic operations, such as the decryption or encryption of messages.

As discussed earlier, in an alternate embodiment, the process 500 may, at process blocks 510 and 528, respectively forward the scanned biometric and the entered password to the card 34 for comparison. In that case, the respective scanned biometric or password are temporarily stored in memory 36 of the card 34. The processor 35 of the card then compares the scanned biometric (in process block 510) with its internally stored metric and/or compares the entered password (process block 528) with its internally stored password. Upon comparison, the processor 35 issues a status signal to the verification unit 20a, that is representative of the result of the search. The verification unit 20a than issues another signal to the computer 12 indicative of this result. The process 500 then proceeds as described above. It is understood by one skilled in the technology that the status signal may be implemented as a status bit or a flag that is forwarded from the card 34 to the verification unit 20a or from the verification unit 20a to the computer 12.

In alternate embodiments, the verification unit 20a can perform additional security functions for the protection of application programs running on the CPU 40 in computer 12, which is in turn coupled to a computer network or system. These functions include the creation and alteration of users who are authorized to use the application programs, and are described in earlier sections.

Figure 14B:
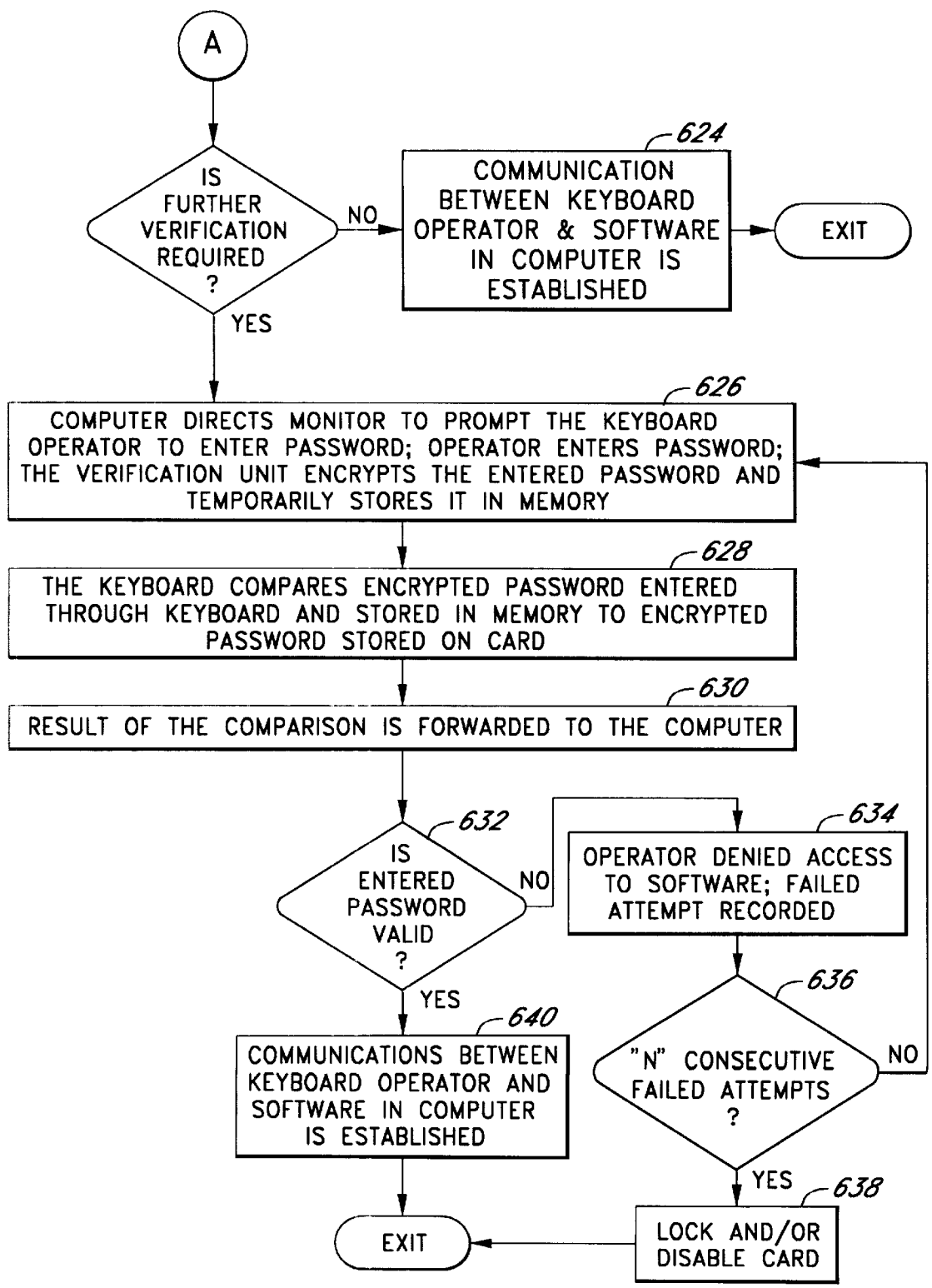

FIGS. 14A and 14B illustrate a flow chart of a third embodiment of the access authorization process of the present invention. For a two-factor verification process, in which the scanned biometric is compared with a stored metric, the process 600 may be implemented using any one of: the keyboard 16a (FIG. 12A) in conjunction with the verification unit 20 (FIG. 2); the keyboard 16 (FIG. 2) in conjunction with an external scanner that is coupled to the keyboard 16, and the verification unit 20; or the keyboard 16b. For a three-factor verification process, in which the scanned biometric is compared with a stored metric, and an entered password is compared to a stored password, the process 600 may be implemented using any one of: the keyboard 16b; the keyboard 16 (FIG. 2) in conjunction with the verification unit 20a (FIG. 10); the keyboard 16a (FIG. 12A) in conjunction with the verification unit 20 (FIG. 2); the keyboard 16 in conjunction with an external scanner that is coupled to the keyboard unit 16, and the verification unit 20. In alternate embodiments, various combinations of the keyboard 16, 16a and 16b, the verification unit 20, 20a and the scanner 25 may be implemented to perform the process 600 in accordance with the principles of the present invention. For present discussion purposes, the keyboard 16b will be referred to in the following sections. In addition, although a biometric is referred to in the process 600, it is understood that other scannable indicia may also be used in implementing the access authorization process.

To gain access to a software application enabled with the PAC security application program interface, access authorization from the keyboard 16b must first be obtained. This authorization is obtained as follows. Beginning from a start state, the process 600 proceeds to process block 602, where the PACS running on CPU 40 in computer 12 issues a command to the keyboard 16b for initiating access authorization. The card 34 may be inserted in the card reader 90 of the keyboard 16b at this time.

The communications path between the keyboard 16B and the computer 12 is then suspended, as shown in process block 604. The keyboard 16b then turns on the LED 92, indicating that the path for entering the biometric is secure. The process 600 then advances to process block 606, where the CPU 40 directs the monitor 14 to display the message "Please present biometric". The operator then presents his or her biometric for scanning by scanner 25a. The scanner 25a scans the biometric and temporarily stores the scanned biometric in RAM 84b.

The process 600 then advances to process block 608, where the keyboard 16b reads the metric stored on the card 34 through the card reader 90. The metric from the card 34 is temporarily stored in RAM 84b. The process 600 then proceeds to process block 610, where the processor 80 in the keyboard 16b determines if the scanned biometric is valid by comparing it to the metric previously stored on the card 34. The result of the validation process is sent to the computer 12, as shown in process block 612. The process 600 advances to decision block 614, where the CPU 40 in computer 12 determines if result provided indicates that the scanned biometric is valid. If the CPU 40 determines that the scanned biometric is invalid, it issues a command to the processor 80 in the keyboard 16b remain in a state in which the communications path between the keyboard and the computer remains suspended. The operator is thus denied access to the software on the computer 12, as shown in process block 616. In addition, the failed attempt is recorded by the card 34.

The process 600 then proceeds to decision block 618, where the keyboard 16 determines if a predetermined number M of consecutive failed attempts have been recorded. If not, the process 600 returns to process block 606, where the operator is allowed another attempt at entering the biometric. If, however, the keyboard 16 determines that the predetermined number M of consecutive failed attempts has been reached, the process 600 proceeds to process block 620, where the card 34 is locked and/or permanently disabled. The process 600 then terminates. This feature of the keyboard 16 ensures that consecutive tries at presenting the biometric can be detected. In addition, this feature of the keyboard 16b provides additional security by locking and/or permanently disabling the card 34 after a predetermined number of consecutive failed attempts has occurred.

If, at decision block 614, the scanned biometric is determined to be valid, the process 600 determines if further verification is required, as shown in decision block 622. If not, the CPU 40 in computer 12 issues a command to the processor 80 in the keyboard 16b to direct the processor 80 to proceed to a state in which communications between the keyboard 16b and computer 12 may be established, as shown in process block 624. The process 600 then terminates.

If further verification is required, the process 600 proceeds to process block 626, where the CPU 40 directs the monitor 14 to display the message "Please enter password". The keyboard operator then enters his or her password via keyboard 16. The password is encrypted and temporarily stored in RAM 84b.

The process 600 then advances to process block 628, where the keyboard 16b reads the encrypted password stored on the card 34 through the card reader 68. The encrypted password from the card 34 is temporarily stored in RAM 84b. The process 600 then proceeds to process block 628, where the processor 60 in the keyboard 16b determines if the entered encrypted password is valid by comparing it to the encrypted password previously stored on the card 34. The result of the validation process is sent to the computer 12, as shown in process block 630. The process 600 advances to decision block 632, where the CPU 40 in computer 12 determines if result provided indicates that the entered password is valid. If the CPU 40 determines that the password is invalid, it issues a command to the processor 80 in the keyboard 16b to remain in a state in which communications between the keyboard 16b and the computer 12 remains suspended. The operator is thus denied access to the software on the computer 12, as shown in process block 634. In addition, the failed attempt is recorded by the card 34.

The process 600 then proceeds to decision block 636, where the keyboard 16b determines if a predetermined number N of consecutive failed attempts have been recorded. If not, the process 600 returns to process block 626, where the operator is allowed another attempt at entering the correct password. If, however, the keyboard 16b determines that the predetermined number N of consecutive failed attempts has been reached, the process 600 proceeds to process block 638, where the card 34 is locked and/or permanently disabled. The process 600 then terminates. This feature of the keyboard 16b ensures that consecutive tries at guessing the password can be detected. In addition, this feature of the keyboard 16b provides additional security by locking and/or permanently disabling the card 34 after a predetermined number of consecutive failed attempts has occurred.

If, at decision block 632, the entered password is determined to be valid, the CPU 40 in computer 12 issues a command to the processor 80 in the keyboard 16b to direct the processor 80 to proceed to a state in which communications between the keyboard 16b and computer 12 may be established, as shown in process block 640. The process 600 then terminates. Alternatively, the CPU 40 may prompt the keyboard operator to enter a second password, and process blocks 626–640 may be repeated to provide additional security. The application software program or programs accessed by the operator upon authentication of his scanned biometric and/or entered password may be used to perform cryptographic operations, such as the decryption or encryption of messages.

As discussed earlier, in an alternate embodiment, the process 600 may, at process blocks 610 and 628, respectively forward the scanned biometric and the entered password to the card 34 for comparison. In that case, the respective scanned biometric or password are temporarily stored in memory 36 of the card 34. The processor 35 of the card then compares the scanned biometric (in process block 610) with its internally stored metric or compares the entered password (process block 628) with its internally stored password. Upon comparison, the processor 35 issues a status signal to the keyboard 16b, that is representative of the result of the search. The keyboard 16b then issues another signal to the computer 12 indicative of this result. The process 600 then proceeds as described above. It is understood by one skilled in the technology that the status signal may be implemented as a status bit or a flag that is forwarded from the card 34 to the keyboard 16b or from the keyboard 16b to the computer 12.

In one embodiment, the keyboard 16b can perform additional security functions for the protection of application programs running on the CPU 40 in computer 12, which is in turn coupled to a computer network or system. These functions include the creation and alteration of users who are authorized to use the application programs, as described in earlier sections.

The present invention thus provides access control to one or more application programs running on the computer, while reducing the need for reliance on human memory in retrieving the personal access code, and also reducing human error in entering the personal access code to the authentication system. The present invention also provides enhanced security by providing a two or three-factor authentication system and method.

The present invention may be embodied in other specific forms without departing from its spirit or essential characteristics. The described embodiments are to be considered in all respects only as illustrative and not restrictive. The scope of the invention is, therefore, indicated by the appended claims rather than the foregoing description. All changes which come within the meaning and range of equivalency of the claims are to be embraced within their scope.

What is claimed is:

1. A security verification apparatus for controlling access to at least one program on a computer from a keyboard, comprising:
   a scanner that scans a field;
   a memory;
   a processor coupled to said scanner and memory, said processor comparing the scanned field with a field stored in said memory;
   said processor being operable in a first mode wherein access to the computer via the keyboard is inhibited when the scanned field does not match the stored field, said processor being operable in a second mode, wherein the keyboard is coupled to the computer so that the at least one program on the computer is accessible via said keyboard when the scanned field matches the stored field.

2. The apparatus of claim 1, wherein the processor, the scanner and the memory are located in the keyboard.

3. The apparatus of claim 1, further comprising a scanner interface circuit that is coupled to said scanner, said scanner interface circuit being coupled to an auxiliary device.

4. The apparatus of claim 1, wherein said processor operates in a third mode in which said processor is coupled to the computer and wherein access to the processor from the keyboard is inhibited.

5. The apparatus of claim 4, wherein the scanned field is a biometric, and the stored field is a metric.

6. The apparatus of claim 1, further comprising a light emitting diode which indicates the operation of said processor in the first mode.

7. The apparatus of claim 1, further comprising a card reader/writer for reading data from and writing data to the card.

8. The apparatus of claim 1, further comprising:

a port that receives data from the keyboard, said processor reads the data from the card and compares the data from the keyboard with the data from the card, said processor being operable in the first mode if the entered data does not match the stored data, said processor being operable in a second mode, wherein the keyboard is coupled to the computer so that the at least one program on the computer is accessible via said keyboard when the data from the keyboard matches the data from the card.

9. A method for controlling access to at least one program running on a computer via a keyboard, comprising:

(a) providing a verification device having a scanner;

(b) scanning a field;

(c) comparing the scanned field with a stored field;

(d) providing access through a keyboard to at least one program on the computer if said scanned field matches said stored field; otherwise denying access through the keyboard to the at least one program on the computer.

10. The method of claim 9, further comprising, prior to (b):

(e) providing a connector having a first port, a second port and a third port; and (f) connecting the first port to the computer, the second port to a keyboard and the third port to the verification device, so that the keyboard and the computer are coupled to the verification device.

11. The method of claim 10, further comprising:

(g) receiving data from the keyboard;

(h) reading data from the card;

(i) comparing the data from the keyboard to the data from the card;

(j) granting access to the at least one program on the computer if the scanned field matches the stored field and if the data from the keyboard matches the data from the card; and (k) otherwise denying access to the at least one program on the computer.

12. The method of claim 9, wherein in (b), the field is a biometric and in (c), the field is a metric.

13. The method of claim 9, wherein (g) comprises:

(g.1) providing a signal indicating that said verification device is ready to receive data from the keyboard; and (g.2) receiving the data from the keyboard.

14. The method of claim 10, wherein (j) comprises the block of:

granting access to the at least one program on the computer if the data from the keyboard matches the data from the card by coupling the computer to the keyboard.

15. The method of claim 10, wherein (k) comprises the block of:

denying access to the at least one program on the computer if the data from the keyboard does not match the data from the card by ensuring that the keyboard is de-coupled from the computer.

16. A system for verifying access authorization to at least one program on a computer, comprising:

a keyboard;

a card that contains verification data;

a verification device having a scanner that scans a field, said verification device compares the scanned field to a field stored on the card, said verification device being operable in a first mode wherein access to the at least one program on the computer via the keyboard is inhibited, said verification device being operable in a second mode, wherein the keyboard is coupled to the computer so that the computer is accessible via said keyboard when the scanned field matches the stored field.

17. The system of claim 16, wherein the verification device operates in the first mode when the scanned data does not match the stored data.

18. The system of claim 16, wherein the verification device operates in the first mode in response to a first command from the computer.

19. The system of claim 16, wherein the verification device operates in the second mode in response to a second command from the computer.

20. The system of claim 16, wherein said verification device operates in a third mode in which said verification device is coupled to the computer and wherein access to the verification unit from the keyboard is inhibited.

21. The system of claim 16, wherein said verification device is located in said keyboard.

22. The system of claim 16, wherein the scanned field is a biometric and the stored field is a metric.

* * * * *